(12) United States Patent
Alun-Jones et al.

(10) Patent No.: US 11,261,548 B2
(45) Date of Patent: Mar. 1, 2022

(54) METHOD OF KNITTING A FABRIC USING A KNITTING MACHINE AND A KNITTING MACHINE

(71) Applicant: Unmade Ltd., London (GB)

(72) Inventors: Benjamin Alun-Jones, London (GB); Benjamin Vosper, London (GB); Kirsty Emery, London (GB); Hal Watts, London (GB)

(73) Assignee: Unmade Ltd.

( * ) Notice: Subject to any disclaimer, the term of this patent is extended or adjusted under 35 U.S.C. 154(b) by 84 days.

(21) Appl. No.: 16/483,665

(22) PCT Filed: Feb. 8, 2018

(86) PCT No.: PCT/EP2018/053182
§ 371 (c)(1),
(2) Date: Aug. 5, 2019

(87) PCT Pub. No.: WO2018/146197
PCT Pub. Date: Aug. 16, 2018

(65) Prior Publication Data
US 2019/0368084 A1    Dec. 5, 2019

(30) Foreign Application Priority Data
Feb. 8, 2017 (GB) .................... 1702106

(51) Int. Cl.
*D04B 7/04* (2006.01)
*D04B 15/66* (2006.01)
(Continued)

(52) U.S. Cl.
CPC .......... *D04B 1/102* (2013.01); *D04B 7/045* (2013.01); *D04B 15/66* (2013.01);
(Continued)

(58) Field of Classification Search
CPC ............... G05B 2219/45194; D04B 7/045
(Continued)

(56) References Cited

U.S. PATENT DOCUMENTS 3,772,899 A * 11/1973 Novi .................. D04B 1/246
66/176
4,199,965 A    4/1980 Wilson
(Continued)

FOREIGN PATENT DOCUMENTS

EP    3261800       3/1988
EP    0959161 A2 * 11/1999  ............ D04B 1/22
(Continued)

OTHER PUBLICATIONS

International Search Report and Written Opinion for PCT/EP2018/053182 dated Jul. 5, 2018 (13 pages).
(Continued)

*Primary Examiner* — Khoa D Huynh
*Assistant Examiner* — Grace Huang
(74) *Attorney, Agent, or Firm* — Conley Rose, P.C.

(57) ABSTRACT

Disclosed is a method and apparatus for knitting a fabric using a knitting machine. The knitting machine is arranged to knit with a plurality of yarns using a corresponding plurality of knitting needles, each knitting needle being arranged during knitting of a stitch to connect with and knit with one of the plurality of yarns. The method controllably varies the stitch length for each stitch in dependence on the pattern to be knitted.

19 Claims, 16 Drawing Sheets

(51) Int. Cl.
*D04B 1/10* (2006.01)
*D04B 7/26* (2006.01)

(52) U.S. Cl.
CPC ............ *A41D 2500/10* (2013.01); *D04B 7/26* (2013.01); *D10B 2403/023* (2013.01); *G05B 2219/45194* (2013.01)

(58) Field of Classification Search
USPC ........................................................ 700/141
See application file for complete search history.

(56) References Cited

U.S. PATENT DOCUMENTS

| | | | | |
|---|---|---|---|---|
| 4,364,245 | A | | 12/1982 | Leins et al. |
| 5,369,966 | A | * | 12/1994 | Morita ..................... D04B 7/26 66/125 R |
| 5,838,570 | A | * | 11/1998 | Barea ..................... B65H 61/00 700/143 |
| 6,688,144 | B2 | * | 2/2004 | Nishikawa ............. D04B 37/02 66/232 |
| 6,845,285 | B2 | * | 1/2005 | Kakimoto ............. D04B 37/02 222/383.1 |
| 6,899,591 | B2 | * | 5/2005 | Mitchell ................. A41C 5/00 450/65 |
| 7,272,462 | B2 | * | 9/2007 | Smedley ............... D04B 37/02 700/141 |
| 7,643,898 | B2 | * | 1/2010 | Takeda ................ D04B 15/327 700/141 |
| 8,000,829 | B2 | * | 8/2011 | Terai ..................... D04B 37/02 700/141 |
| 2016/0194792 | A1 | * | 7/2016 | Satharasinghe ........ H05K 1/038 428/102 |
| 2019/0156265 | A1 | * | 5/2019 | Lai ..................... G06Q 10/0633 |

FOREIGN PATENT DOCUMENTS

| | | | | |
|---|---|---|---|---|
| EP | 1266990 | | 12/2002 | |
| EP | 1536050 | | 6/2005 | |
| EP | 1536050 | A1 * | 6/2005 | ........... D04B 15/327 |
| EP | 2280104 | | 2/2011 | |
| EP | 2280104 | A1 * | 2/2011 | ............. D04B 7/045 |
| EP | 2287376 | A1 | 2/2011 | |
| EP | 2921580 | A1 | 9/2015 | |
| EP | 3315642 | A1 * | 5/2018 | ............... D04B 7/24 |
| GB | 1200473 | A | 7/1970 | |
| WO | 2015177338 | | 11/2015 | |
| WO | 2016075263 | | 5/2016 | |
| WO | 2016124777 | | 8/2016 | |

OTHER PUBLICATIONS

Chinese Office Action dated Aug. 4, 2020, for Chinese Application No. 2018800224564 (9 p.).
English Translation of Chinese Office Action dated Aug. 4, 2020, for Chinese Application No. 2018800224564 (5 p.).
British Search Report dated Apr. 28, 2017, for GB Application No. 1702106.4 (5 p.).

* cited by examiner

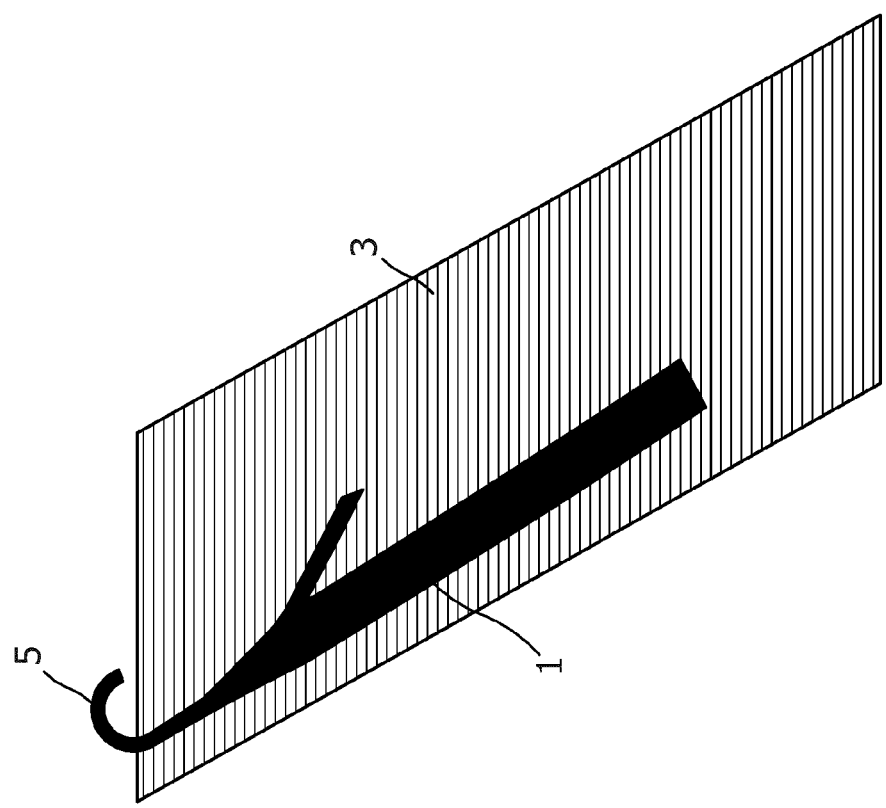
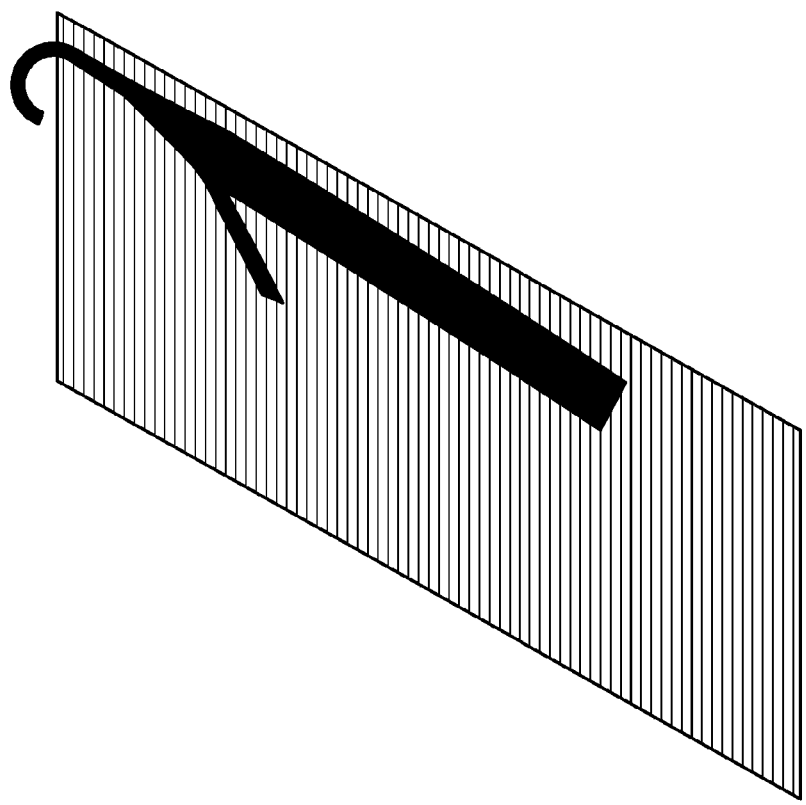
Fig. 1D

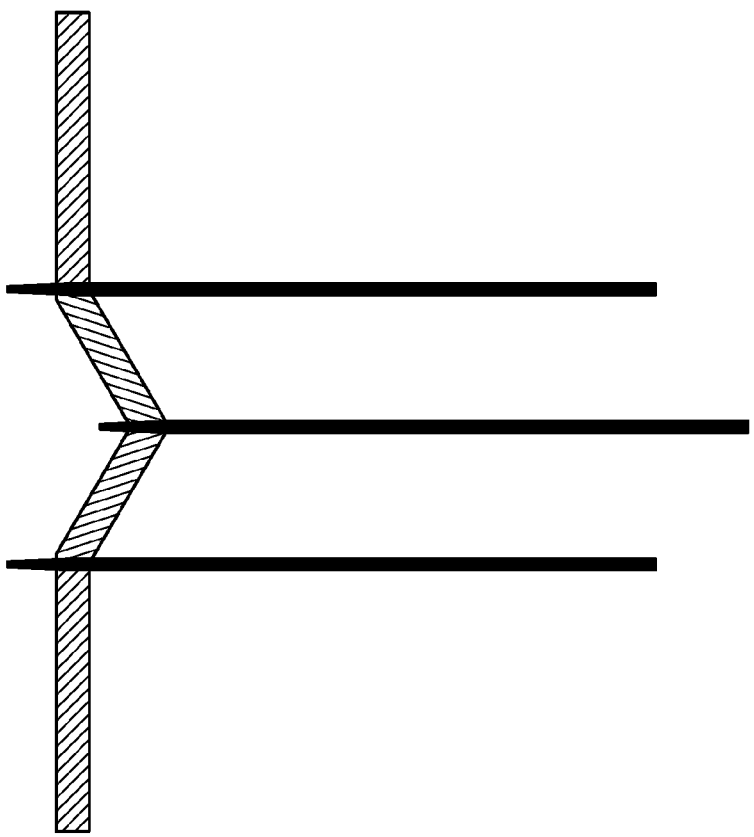
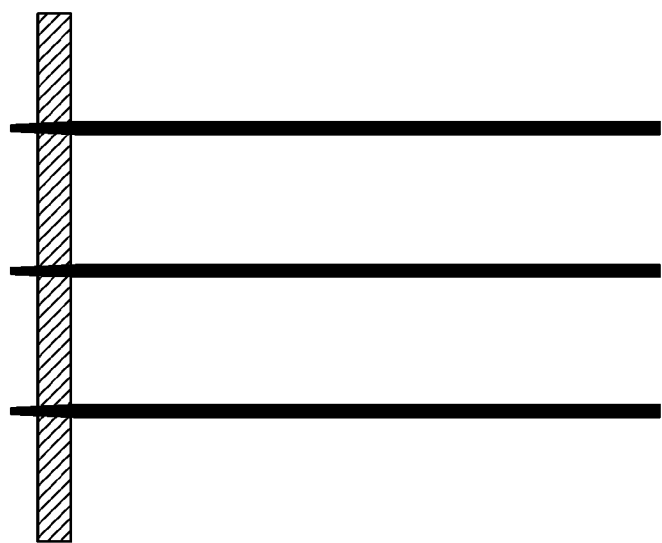
Fig. 1G

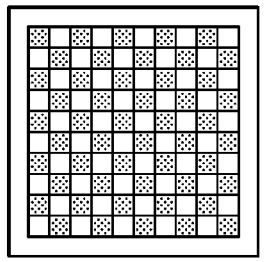
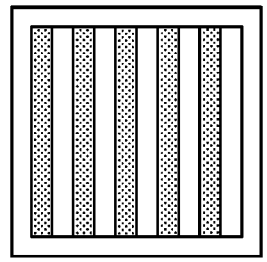
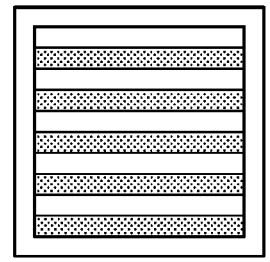
Fig. 2A              Fig. 2B              Fig. 2C
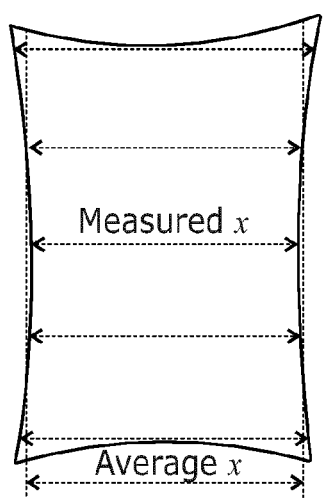
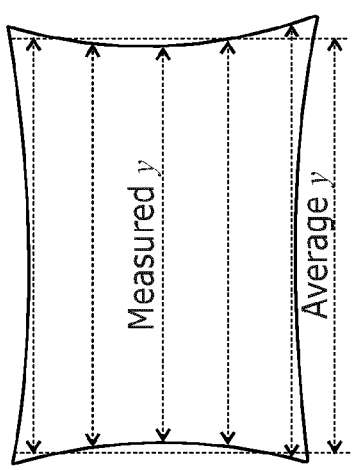
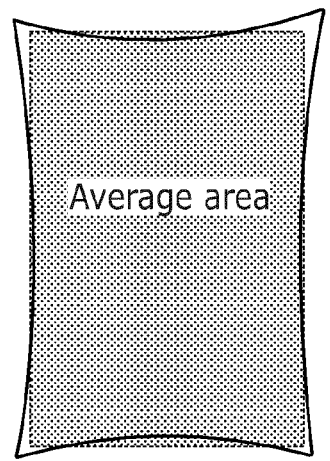
Fig. 3A              Fig. 3B              Fig. 3C ApS and Density. Colours indicate the tension of the sample

*ApS* Intercept and Tension

*R* and Density. Colours indicate the tension of the sample

*ApS* Intercept and Tension

*ApS* and Density, 3 Colour, Colours indicate the tension of the sample

*ApS* Intercept and Tension, 3 colour

R and Density, 3 colour. Colours indicate the tension of the sample

R Intercept and Tension, 3 colour

Changes in dimensions from washing 2 colour samples

Changes in dimensions for 3 colour samples

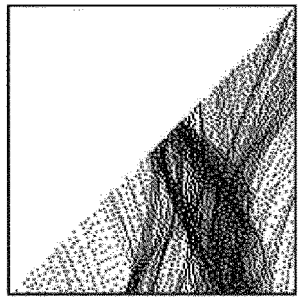 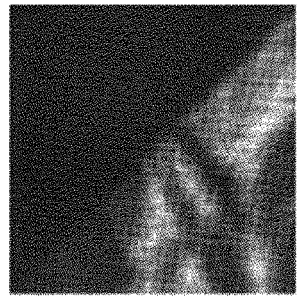 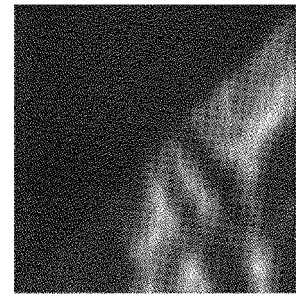

Fig. 15a            Fig. 15b            Fig. 15c a  Example pattern (150x150 stitches)
b, Initial density map produced by horizontal differencing kernel and multi-row windowed average
c, Density map with additional vertical Gaussian blur

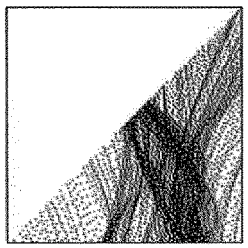 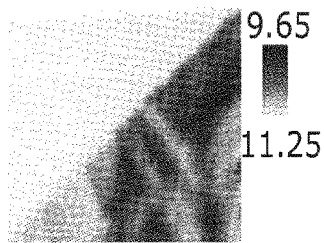 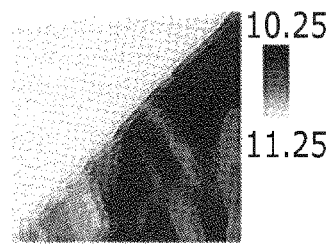

Fig. 16a            Fig. 16b            Fig. 16c a  Example pattern (150x150 stitches)
b, Target tension map calculated using density map and model parameters/ In this case, target stitch-length is 1.13mm
c, Tension map quantised to a useable number of unique tensions (15). Additionally, a minimum horizontal region size (6 stitches in this example) and yarn-dependent safe limits are enforced.

*Parameters used for this example were calculated for 2-colour, Merino wool, net jacquard. All tension values in arbitrary units.*

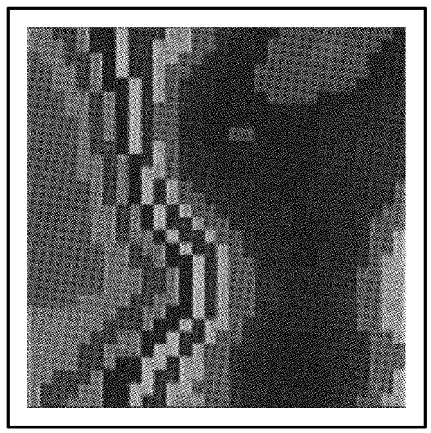 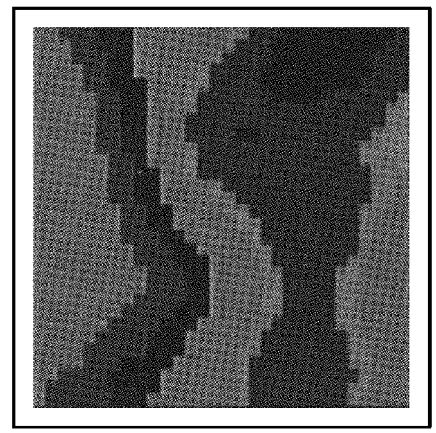
Fig. 17A　　　　　　　　Fig. 17B
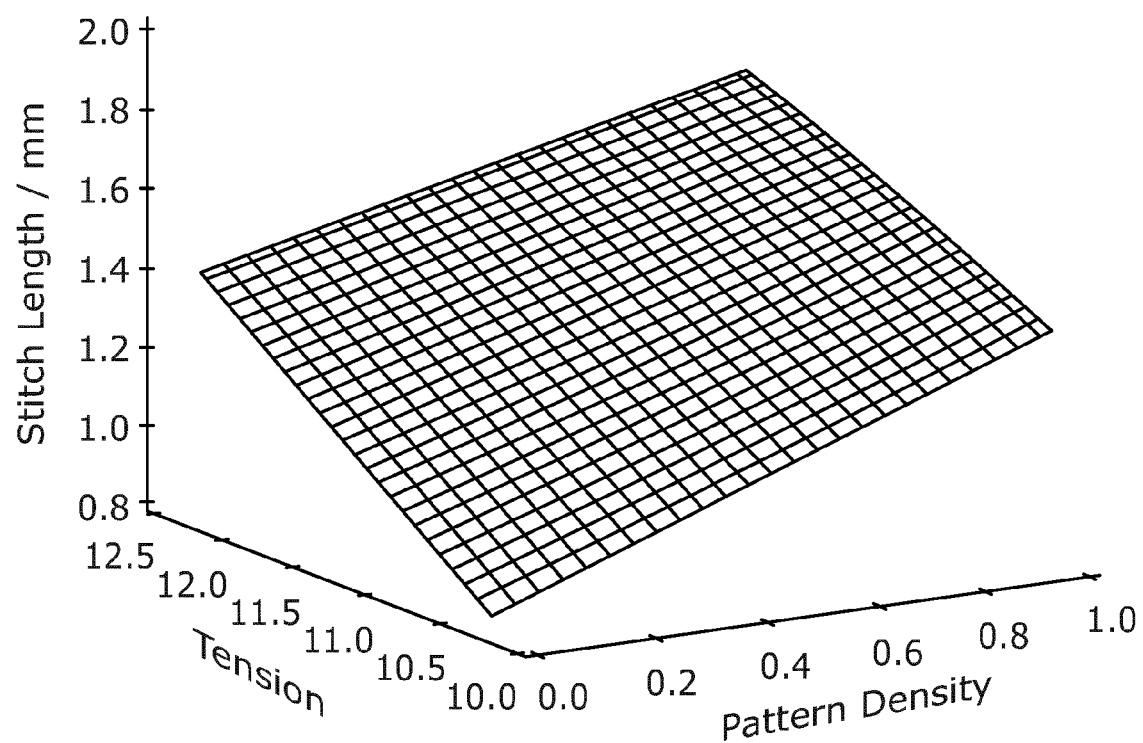
Fig. 18

METHOD OF KNITTING A FABRIC USING A KNITTING MACHINE AND A KNITTING MACHINE

CROSS REFERENCE TO RELATED APPLICATIONS

This application is the U.S. National Stage entry under 35 U.S.C. § 371 of International Patent Application No. PCT/EP2018/053182, filed Feb. 8, 2018, and entitled "A Method of Knitting A Fabric Using A Knitting Machine And A Knitting Machine," which claims priority to GB Application No. 1702106.4 filed on Feb. 8, 2017, entitled "A Method of Knitting A Fabric Using A Knitting Machine And A Knitting Machine", all of which are incorporated by reference herein in their entireties for all purposes.

STATEMENT REGARDING FEDERALLY SPONSORED RESEARCH OR DEVELOPMENT

Not applicable.

BACKGROUND

The present disclosure relates to a method of knitting a fabric using a knitting machine and also relates to a knitting machine.

Knitting machines are typically used to produce garments or fabric for the manufacture of garments. Typically, patterns are provided on the fabric and may be created by selection of appropriate colours of yarns for use in the knitting process.

In the production of double-layered garments using two colours of yarn, the presence of a stitch of the first colour in the front layer results in the opposing stitch in the rear layer being the second colour. The formation of the pattern in the garment is a result of combinations of the two colours in the front layer. For a second colour stitch to be displayed on the front of the garment, the first colour yarn switches to the back layer. Similarly, for a stitch of a first colour to be displayed on the front of the garment, the second coloured yarn would switch to the back layer. This process of changing the coloured yarn that appears on the front and therefore forms the pattern on the garment is known as "swapping", as explained below with reference to FIGS. 1A and 1B. Within an individual swap, there is a slight excess of yarn in between the layers of the panel. Although this excess for a single stitch would be a very small actual amount, over a whole garment or length of fabric, the variation can be significant.

Although described herein predominantly with reference to two yarns of two different colours, it will be appreciated that the disclosure is not so limited, since in practice within the field of knitting and knitting machines any number of yarns can be used (of any number of different or similar colours).

It has long been known that knitting machines can be used efficiently to produce large volumes of garments to a common pattern. When such a machine is operated, e.g. a knitting machine as manufactured by Stoll GmbH or Shima Seiki, the input file to the machine must be determined. The input file specifies various parameters that are necessary for the machine to be able to produce the garment or fabric. It would include the type and colour of yarns and the pattern to be knitted.

When producing a large number of garments, there is initially a calibration stage wherein parameters such as the number and size of stitches (typically stitch length) can be varied using trial and error, so as to ensure that the size of garment produced to the chosen pattern is consistent with that desired. It is possible with use of such a knitting machine, that even if the same knitting pattern is used, if the yarn is changed the dimensions of the produced fabric or article of clothing could be different. Furthermore, if a different knitting pattern is used, albeit with the same overall number of stitches in both x and y dimensions, the size of the produced article could be different.

To understand one situation in which stitch length and tension can be related reference is now made to FIGS. 1C to 1G. These figures show variously side views and end views of one type of double-bed knitting machine in which a plurality of needles 1 are arranged on angled beds 3. Each of the needles has a hook part 5 arranged to selectively engage with yarns (not shown) which typically in use run perpendicular to the needles 1. FIG. 1C shows a plurality of needles 1 arranged on an angled bed. All of the needles are at rest position. FIG. 1D shows an end view of the configuration of the machine in FIG. 1C.

During knitting, as seen in FIG. 1E the needles, in sequence, are driven up and then down so as to catch a yarn when at the top and then to pull it down into a stitch during the downward movement of the needle. FIG. 1F shows an end view of the configuration of the machine in FIG. 1E. In FIG. 1F both beds can be seen whereas in FIGS. 1C and 1E only one of the beds is shown. As can be seen, compared to the view of FIG. 1C the two needles shown are raised such that their hooks can catch a desired yarn. The needles are then pulled down. This is shown schematically in FIG. 1G which shows the central one of the three needles shown being lower than the other two as it is in the process of completing a stitch. The depth to which the central needle is pulled controls the stitch length for that particular stitch.

It will be appreciated that what is described here is one particular type of knitting machine and how stitch lengths or tensions can be controlled within it. The description above applies irrespective of the type of knitting machine and would apply equally to, say, single-bed knitting machines or indeed any suitable type of knitting machine. Indeed, although there are many different types of knitting machines available the same general principle will apply to stitch length or tension control.

If a large number of similar items are being manufactured, say a run of 2000 jumpers, then even if it takes a number of iterations until a desired configuration for the knitting machine can be arrived at, this is not a significant problem. "Wasting" 5 garments worth of fabric out of a run of 2000 represents a small proportion of the overall material used.

There is currently a desire to be able to do smaller and smaller runs of production of articles to a common design and in fact even to produce just a single article according to a chosen design. In this situation, clearly trial and error is not a commercially feasible way to arrive at the input settings for a knitting machine. This would represent a significant amount of wastage.

Knitting machines are known and a number of examples and methods for operating or controlling are described in PCT/EP2015/061375, PCT/EP2015/076485 and PCT/EP2016/052571, and US-A-2015/0366293.

SUMMARY OF DISCLOSURE

According to a first aspect of the present disclosure, there is provided a method of knitting a fabric using a knitting machine, wherein the knitting machine is arranged to knit with a plurality of yarns using a plurality of knitting needles, each knitting needle being arranged during knitting of a stitch to connect with and knit with one of the plurality of yarns; the method comprising controllably varying the stitch length for stitches in dependence on the pattern to be knitted.

It has been recognised that by varying the stitch length for stitches across an article to be knitted in accordance with the density (or number) of swap an improved degree of predictability of final output size can be made. In conventional use of knitting machines, it is typical for a degree of trial and error to be used to determine input parameters such as stitch lengths or tensions so as to ensure that the garment or fabric knitted comes out an expected and desired size. In certain embodiments of the present method, the stitch length is varied in dependence on the pattern to be knitted, e.g. in dependence on the density (number of swaps per unit area or unit length along a row), such that the produced article will have a predetermined size. This is advantageous as it enables small numbers of articles to be created on a knitting machine without the risk that they will come out the wrong size even though a set pattern has been used and instructions followed. In another example, the stitch length is varied in dependence on the number of swaps in a pattern to be knitted. This would of course be proportional to the density but the processing could be performed without determining the value for the density itself.

There are a number of advantages to assigning tensions to individual stitches. Most notably is that for regions of a fabric or garment over which pattern density changes, the tension of stitches can be varied so as to result in a sample or product of uniform dimensions. Applying tensions on a stitch-by-stitch basis, which is enabled by the present method, allows these problems to be bypassed by dynamically modifying the dimensions of each stitch. This provides a designer with confidence that a given design will appear as intended and is of particular importance when a large number of designers or customer-designed products are to be produced correctly and consistently.

The depth that any particular needle descends to (and therefore the amount of yarn that is pulled into a stitch) is controlled by a stepper motor. Hence, the parameter most commonly referred to is stitch length meaning the depth to which the needle is pulled. The depth is what is specifically controlled by the stepper motors within such a machine. Although what is actually being controlled is the depth that the needle is pulled to, it can also be referred to as 'tension control' since the feed of yarn into the machine is controlled through friction. In any given situation, the yarn will be at some defined tension and so the deeper the needle is pulled the greater the tension imparted to the yarn within the stitch. Even if, in some cases, the same needle drop is applied, it can be difficult to guarantee the same length of yarn is used for the stitch as this can also depend on the yarn tension from friction when the yarn enters the machine. In any event though, it will be understood that control can be applied to the stepper motors within a knitting machine such that the parameters described above can be managed and the length and/or tension of yarn within each stitch controlled.

In an embodiment, the density of a knitted fabric is defined as the ratio of swaps to stitches present and in which the stitch length is varied in dependence on the density of the pattern of the knitted fabric. As explained above, instead of determining stitch length based on trial and error, the determination could be made based on the number of swaps within the knitted fabric.

In an embodiment, the knitting machine includes a plurality of mechanisms each for controlling a corresponding needle and in which the method comprises individually controlling the mechanisms to achieve the desired yarn stitch length.

In an embodiment, each of the individual mechanisms is a stepper motor and the method comprises controlling operation of the various stepper motors to achieve a desired stitch length. The stepper motors typically used in knitting machines such as those manufactured by Stoll GmbH or Shima Seiki can be controlled to vary the tension of a yarn on a stitch by stitch basis so as to achieve variable stitch length across a garment or piece of fabric being knitted. In other examples the level of granularity utilised not stitch-by-stitch, but rather is done on a quantised level such that blocks of, say, 4 or 6 stitches are each assigned a common length or tension.

In an embodiment, the stitch length is determined in accordance with a model defining parameters based on at least the density of a pattern to be knitted.

In an embodiment, the model is arranged to determine stitch lengths Sx in the x and Sy in the y defined dimensions for a fabric to be knitted, and wherein the model includes the following parameters:

$$ApS = aD + bT + c$$

$$R = eD + fT + g$$

$$Sy = \sqrt{\frac{ApS}{R}}$$

$$Sx = RSy = \sqrt{ApS.R}$$

in which
a: The average gradient of the ApS and D graphs
b: The gradient of the ApS intercept and T line
c: The intercept of the ApS intercept and T line
e: The average gradient of the R and D trend lines
f: The gradient of the R intercept and T line
g: The intercept of the R intercept and T line In an embodiment, a further parameter h is utilised wherein h is defined as the intercept of the R-D gradient and T line and wherein R=(eT+h)D+fT+g.

In an embodiment, density is determined by taking as an input, an initial graphical representation of the pattern to be knitted and then executing the following steps: generating an initial density map based on the pattern to be knitted; and applying a filter to the initial density map to generate a processed density map.

In an embodiment, the method comprises applying the following steps to the processed density map: generating an initial tension map using a parametrised model to determine stitch lengths required to achieve a desired output for the fabric.

In an embodiment, the method comprises generating from the initial tension map, a quantised tension map in which the number of individual tensions used is reduced.

In an embodiment, the reduced number of tensions is between 9 and 16.

In an embodiment, the number of tensions used in the quantised tension map is 15.

According to a second aspect of the present disclosure, there is provided a method of determining stitch lengths for stitches on a knitting machine, to be applied across a fabric during knitting thereof, the method comprising in dependence on the density or number of swaps within the fabric varying the stitch lengths accordingly.

In an embodiment, the density of a knitted fabric is defined as the ratio of swaps to stitches present and in which the stitch length is varied in dependence on the density of the pattern of the knitted fabric.

In an embodiment, the stitch length is determined in accordance with a model defining parameters based on at least the density of a pattern to be knitted.

In an embodiment, the model is arranged to determine stitch lengths Sx in the x and Sy in the y defined dimensions for a fabric to be knitted, and wherein the model includes the following parameters:

$$ApS = aD + bT + c$$
$$R = eD + fT + g$$
$$Sy = \sqrt{\frac{ApS}{R}}$$
$$Sx = RSy = \sqrt{ApS.R}$$

in which
 a: The average gradient of the ApS and D graphs
 b: The gradient of the ApS intercept and T line
 c: The intercept of the ApS intercept and T line
 e: The average gradient of the R and D trend lines
 f: The gradient of the R intercept and T line
 g: The intercept of the R intercept and T line In an embodiment, a further parameter, h, is utilised wherein h is defined as the intercept of the R-D gradient and T line and wherein $R=(eT+h)D+fT+g$.

In an embodiment, density is determined by taking as an input, an initial graphical representation of the pattern to be knitted and then executing the following steps: generating an initial density map based on the pattern to be knitted; and applying a filter to the initial density map to generate a processed density map.

In an embodiment, the method comprises applying the following steps to the processed density map: generating an initial tension map using a parametrised model to determine stitch lengths required to achieve a desired output for the fabric.

In an embodiment, the method comprises generating from the initial tension map, a quantised tension map in which the number of individual tensions used is reduced.

In an embodiment, the reduced number of tensions is between 9 and 16.

In an embodiment, the number of tensions used in the quantised tension map is 15.

In an embodiment, the stitch length is varied so as to control on a per row basis the length of yarn used within an article to be knitted. In other words the model is used to determine stitch lengths over an entire row and the individual stitch lengths can be varied within limits so as to ensure that over an entire row of the knitted article a desired length of yarn is used.

According to a third aspect of the present disclosure, there is provided a knitting machine for knitting a fabric, the knitting machine comprising: a plurality of knitting needles, each knitting needle being arranged to be connected with and knit with one of a plurality of yarns; a controller to controllably vary the stitch length for each stitch in dependence on the pattern to be knitted.

In an embodiment, the knitting machine comprises a plurality of variable tension applicators, each arranged to vary the tension of one or more of the yarns.

In an embodiment, the variable tension applicators are stepper motors.

In an embodiment, the controller comprises a processor arranged to execute the method of the first aspect of the present disclosure so as to determine the stitch lengths and/or tensions to be applied to yarns being used to knit a fabric.

According to a fourth aspect of the present disclosure, there is provided a controller for a knitting machine, said knitting machine being arranged to knit a fabric using a plurality of knitting needles, each knitting needle being arranged to be connected with and knit with one of a plurality of yarns, the controller being arranged to: receive details of a pattern to be knitted determine stitch lengths and/or tensions to be applied to yarns during knitting in dependence on the received details of the pattern to be knitted.

In an embodiment, the controller is arranged to receive details of the pattern and determine a value for density of the pattern, wherein the density is defined as the ratio of swaps to stitches present in the pattern to be knitted and in which the controller is arranged to vary stitch length in dependence on the density of the pattern.

In an embodiment, the controller comprises a processor arranged to execute the method of the first aspect of the present disclosure so as to determine the stitch lengths and/or tensions to be applied to yarns being used to knit a fabric.

BRIEF DESCRIPTION OF THE DRAWINGS

Exemplary embodiments of the present invention will now be described in detail with reference to the accompanying drawings, in which:

FIGS. 1*c* to 1*g* show schematic representations of views of a double-bed knitting machine;

FIGS. 2*a*-2*c* show three representations of alternative pattern configurations for fabric;

FIGS. 3*a*-3*c* show schematically a method for measuring and determining the approximation of the area of a sample of knitted fabrics;

FIGS. 15a to 15c show a pattern, a generated density map, and modified density map for use in providing an input to a knitting machine;

FIG. 16a shows the same pattern of FIG. 15a;

FIGS. 16b and 16c show target and modified tension maps;

FIG. 17a shows a generated tension map;

FIG. 17b shows a quantised tension map;

FIG. 18 is a three-dimensional plot showing variation in stitch length with respect to tension and pattern density;

DETAILED DESCRIPTION OF THE DISCLOSED EXEMPLARY EMBODIMENTS

A method and apparatus of knitting a fabric using a knitting machine is provided. The knitting machine is arranged in use to knit with a plurality of yarns using a plurality of knitting needles. Each knitting needle is arranged during knitting to be connected with one of the plurality of yarns. In other words, for each stitch that is made by a needle, each needle is associated with one of the plurality of yarns. The tensions applied to each of the yarns are controllably varied in dependence on a pattern to be knitted. In particular, a tension control model is used to allow the dimensions of knitted fabrics or jacquards to be successfully controlled. By controlling the tension used, possibly on a stitch-by-stitch basis, the method and apparatus enables unique, user-generated patterns to be produced with desired dimensions and having a consistent and reliable shape, appearance and texture.

Furthermore, as will be described below, the method enables prediction of panel sizes both before and after washing to be accurately achieved. The method applies to any appropriate yarn, including, but not limited to merino wall, cashmere and others. As explained above, as customisation of garments becomes more desirable to customers, which is expected to be the case, a method and apparatus that enables individual items to be knitted using large scale industrial knitting machines and being capable of having a fixed and predetermined size is highly desirable. The problems described above relating to the variation in output size from a knitting machine even though a similar pattern is used as an input means that, with the present method, expensive trial and error methodology can be minimised and/or entirely dispensed with. This therefore makes the production of an individual garment (as opposed to a run of, say 100s or 1000s, of the same item) on industrial knitting machines a technical and commercial possibility.

Figures 1A, 1B:
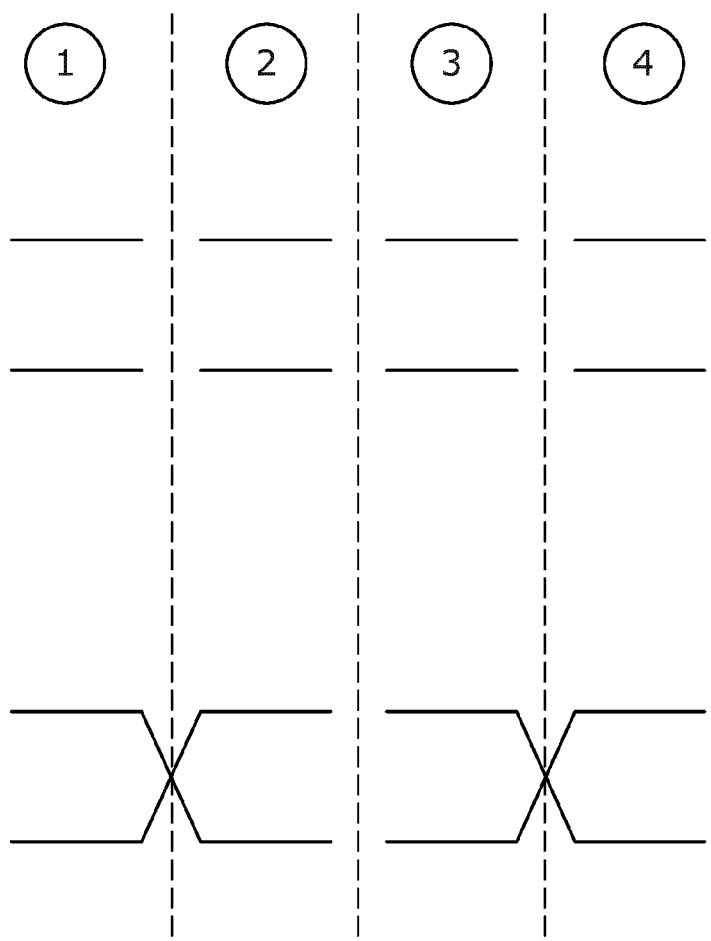
FIGS. 1*a* and 1*b* show schematic representation of stitches within a section through a piece of fabric formed of two different colour yarns.
Figure 1C:
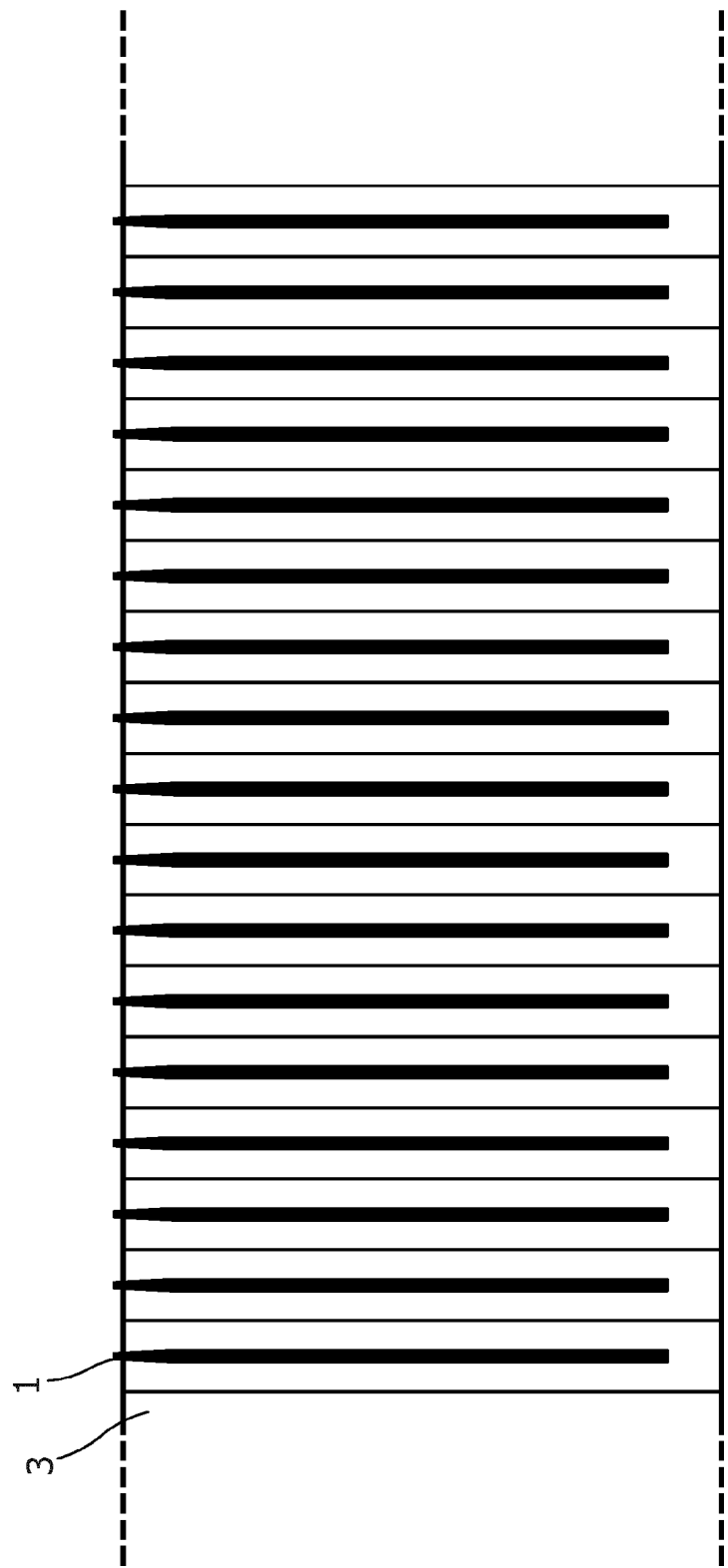
Figure 1E:
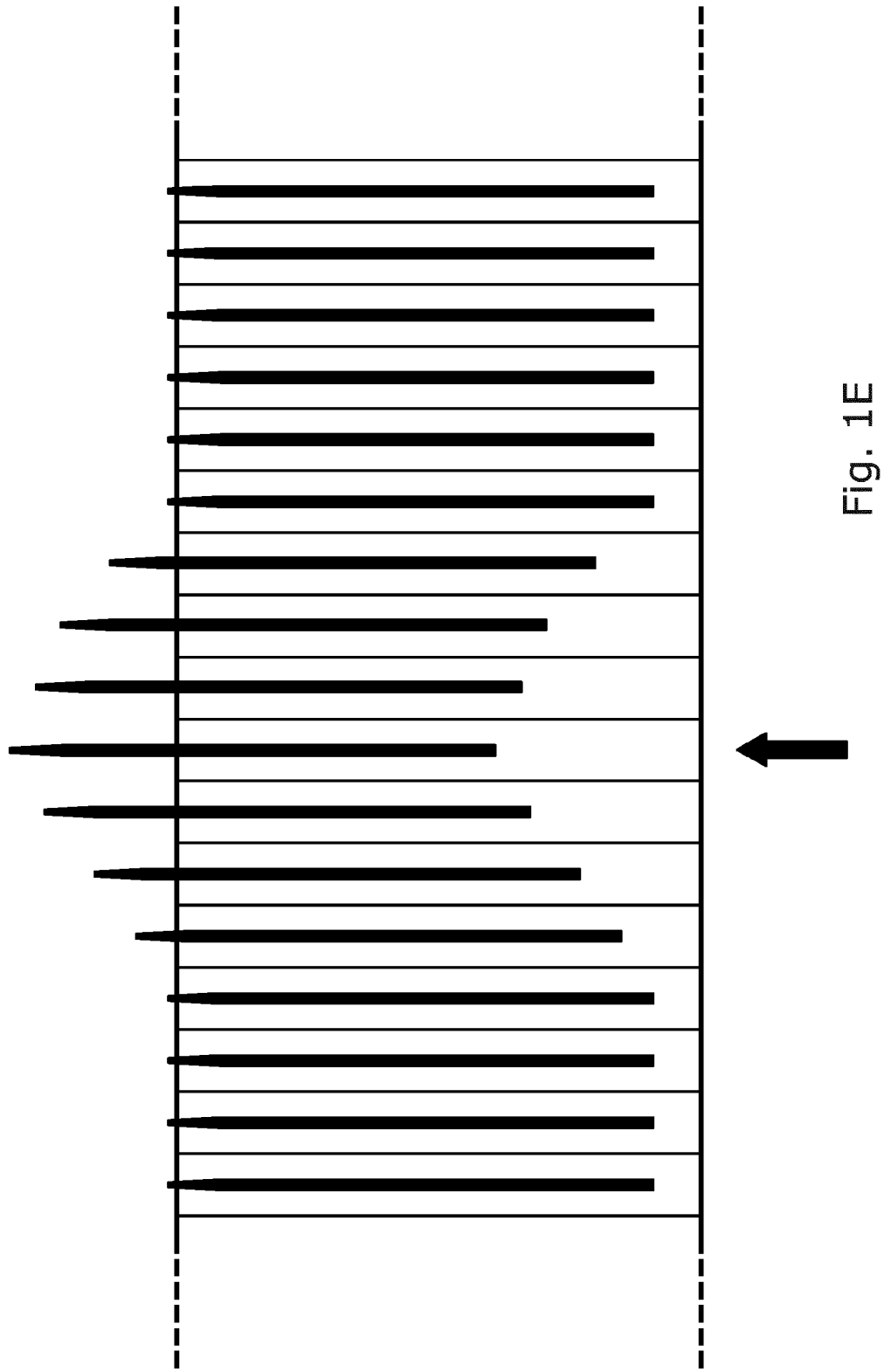
Figure 1F:
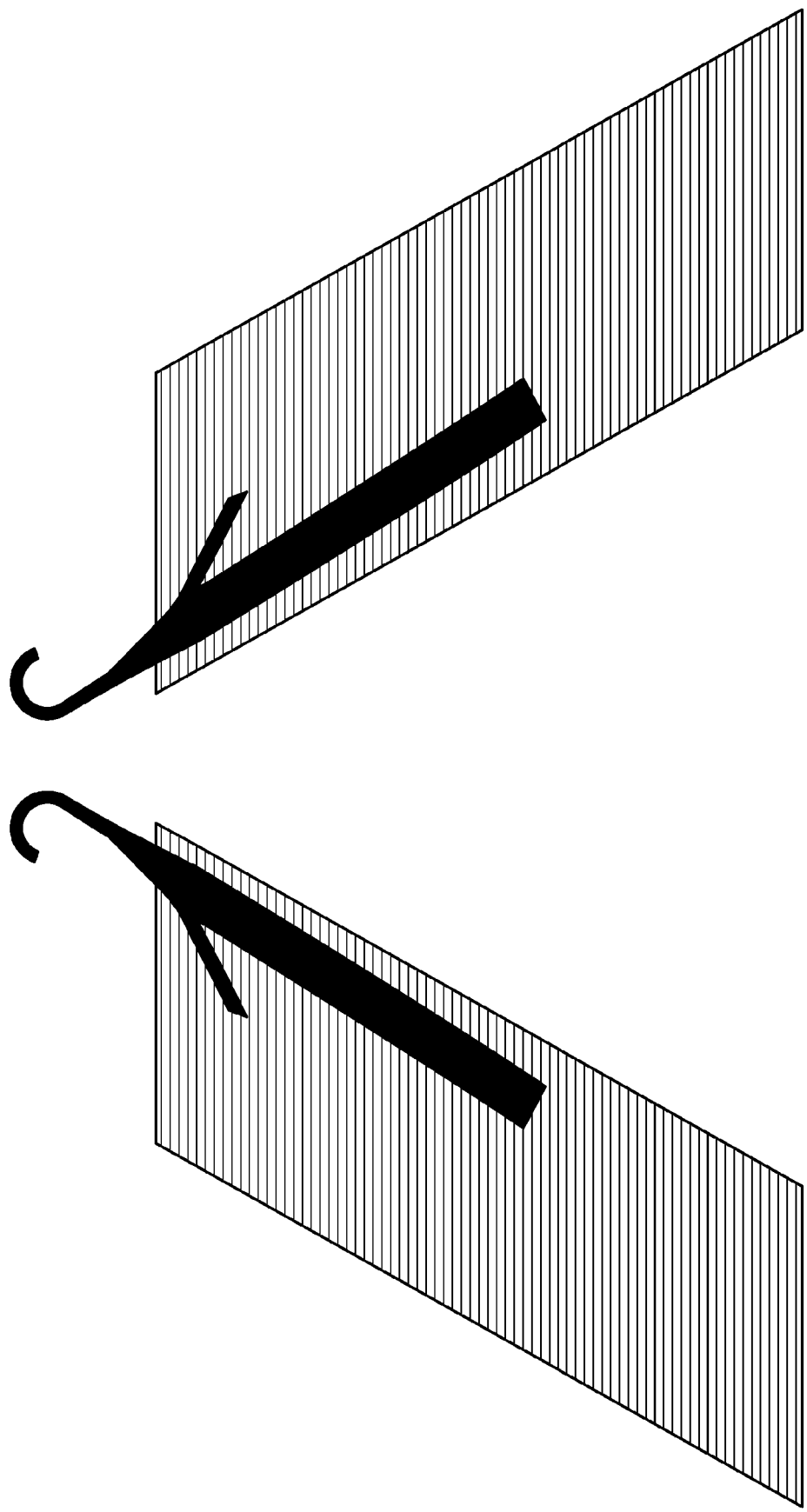

FIG. 1a shows a schematic representation of four stiches within a section through a piece of fabric formed of two different colour yarns wherein in the specific section shown, there are two yarns but no switches (yarn transition from one layer to another). In other words, the first yarn is, for all four stitches, on the same side or surface of the fabric. Typically this would be of a first uniform colour although the yarn itself could have a variable colour. There are therefore no swaps between the layers of yarns.

By contrast, in FIG. 1b, stitch 1 has a first yarn on the upper layer and the same is true of stitch 4. The upper layer of stitches 2 and 3 are of a second yarn. The transition between stitches 1 and 2, and stitches 3 and 4 is shown by the continuation of the second yarn as it swaps to the front of the fabric, moving from stitch 1 to stitch 2 and then back to the rear, moving from stitch 3 to stitch 4. Thus, although only shown schematically, it is clear that an additional length of yarn 2 will be needed for this transition. The same is true for yarn 1 as it passes from the front to the rear for stitches 2 and 3.

FIGS. 2a to 2c show three representations of alternative patterns. It can be appreciated from these figures how samples with the same value of D can in fact have different patterns. FIGS. 2a and 2b share the same number of horizontal swaps and therefore the same value of D, but are visually distinct. FIG. 2c has zero horizontal swaps, which is the same as for a sample of a single uniform colour, but again has a pattern distinct from that.

All other factors being equal, although there will not necessarily be a linear relationship between the variation in size of the resultant region of fabric and the number of swaps, there will be some difference. A fabric with a larger number of swaps between the two yarns, will result in an increase in the physical dimension of the garment or region of fabric when compared to that with fewer, even though the notional number of stitches and the size or length of each of the individual stitches is the same.

A method and apparatus is provided recognising that by controllably varying the tension of stitches during manufacture, a higher degree of consistency, predictability and uniformity can be achieved in a machine-knitted article. A multivariate model is provided incorporating a way of describing the interaction between the tension applied to stitches in a given panel and its resulting dimensions, thereby allowing the variations in stitch length that would ordinarily occur between sections with differing panel pattern density, to be compensated for.

As will be described below, tension information is calculated automatically by the analysis of a pattern applied to a given panel and integrated directly into machine files for provision to a knitting machine. This can be achieved remotely and provided as part of the machine file to a knitting machine or it can be done by a controller or processor integrated into the knitting machine.

This allows any pattern to be knitted with improved consistency in its dimensions and visual appearance. Panels with complex and dynamic patterns can be knitted to required dimensions accurately and reliably, facilitating the production of unique, user-customised garments on commercial knitting machines.

A multivariate model has been created that enables, for a given pattern to be produced, the specific variations in stitch lengths (and consequently yarn tensions) to be used in a knitting machine. A number of parameters are defined and a model generated which is then used to generate tension inputs to a knitting machine. While details of one specific model used will be described below, it will be understood that modifications to the model can be used and that the model is not the only way of achieving determination of the required variation in yarn tensions or stitch lengths to be used on a knitting machine. An example of the relationship between stitch length and yarn tensions is described below with reference to FIGS. 18 and 19.

The model also enables by variation of stitch lengths within an entire row, the length of yarn used for the entire row within an article to be knitted. In other words, although the model may be used to determine individual stitch lengths, these can be averaged or otherwise controlled over an entire row and the individual stitch lengths can be varied within limits so as to ensure that over an entire row of the knitted article a desired length of yarn is used.

Model for Determination of Stitch length for a Pattern

An example of a model for determination of stitch length or tension to be used for stitches within a pattern will now be described. The model is exemplary and other models could be used to determine the variable tensions necessary to ensure predictability and reliability in the size of a machine knitted fabric or garment.

The model is a multivariate model that can be used to determine stitch tension and therefore lengths within a knitted article. As part of the model, parameters are defined or calculated from real examples of knitted articles. A model is then created using the parameters which model can then be used to make predictions and determine control inputs for a knitting machine so as to achieve a desired output.

In one non-limiting example, factors within the model can include any one or more of; the average gradient of the ApS (area per stitch) and Density graphs, the gradient of the ApS intercept and T (tension) line, the intercept of the ApS intercept and T line, the average gradient of R and D trend lines (wherein R is the average x dimension over the average y dimension for all stitches within a sample), the gradient of the R intercept and T line and the intercept of the R intercept and T line.

Looking in detail at one non-limiting specific example, a coefficient of density "D" is defined which is equal to the ratio of swaps to stitches present. Looking at FIGS. 1a and 1b, it will be appreciated that in these sections, in FIG. 1a, there are no swaps for four stitches, thus providing a density D of zero. In FIG. 1b, there are two swaps within the four stitches, thereby producing a density D of 0.5. As the number of swaps cannot exceed the number of stitches, D has a fixed range of zero to one and can be specified over extended regions or on a per-stitch basis. As used herein, the word "density" in relation to a given pattern refers to the coefficient D unless specified otherwise.

In a typical commercial knitting machine, described below with reference to the schematic representation of FIG. 20, the tension at which any given stitch is produced, is variably controlled such that the stitch length is at a defined or desired value. In one example, this might typically be achieved via a system of stepper motors within a knitting machine. The tension may be specified when a sample is produced that corresponds to a physical tensile force applied by the stepper motor to the yarn.

Examples of knitting machines to which the method could be used include those manufactured by Stoll GmbH or Shima Seiki, including but not limited to the Stoll CMS range, and the Shima Seiki SVR and Mach2 ranges.

To generate the model initially, in a number of batches, several samples were knitted (using a Stoll knitting machine) and each of these samples was measured to determine values for two parameters:

Area per Stitch (APS) and
a parameter R explained below and defined as $$\frac{\bar{x}}{\bar{y}},$$

i.e. the average value of x divided by the average value of y for a given sample.

To achieve consistency in the method by which the samples were measured, a method to determine the value of R for a sample was decided upon. For both the x and y dimensions of each sample, five equidistant readings were taken using a simple tape measure. With the samples taking the fairly constant shape of a rectangle with slightly inward curving sides, these readings were taken from the lowest possible perfectly horizontal line to the highest for x and from the rightmost to the leftmost vertical line for the y, minimizing the effects of curved edges. The two rows of stitches at both extremes of the x axis were also excluded. Typically, in a pattern used as an input to a knitting machine, these edge stitches are overwritten in the software to ensure that the layers bond properly. Thus, for the purpose of determining a value for R for each sample, only the remaining 196 stitches from the original pattern were considered. Finally, the mean of the five readings from each axis were taken as the true x and y values and used in all analysis. This process is illustrated in FIGS. 3A to 3C in the figures.

Also important to note is that all samples were lightly steamed before measurement. This process helps to relieve any internal stresses in the yarn structure found in samples fresh out of a knitting machine, ensuring consistency. Indeed, the initial steaming causes extremely visible instantaneous changes in many of the samples. As described below, later investigations into the washing of the samples were aimed to determine whether any further internal relaxation was possible.

FIGS. 3a to 3c show an illustration of the measuring procedure used to produce a consistent approximation of the area of a sample of fabric or garment produced using the present method. A number of measurements are made in two orthogonal directions, x and y, and an average value for each of the x and y dimensions is thus determined. An average area can then be simply calculated by using the averaged dimensions x and y.

FIG. 3a shows how a number of x dimension measurements are taken at various positions along the length of the garment. An average x value is determined. A similar process is performed in the y dimension and an averaged area then calculated as shown in FIG. 3c.

Figure 4:
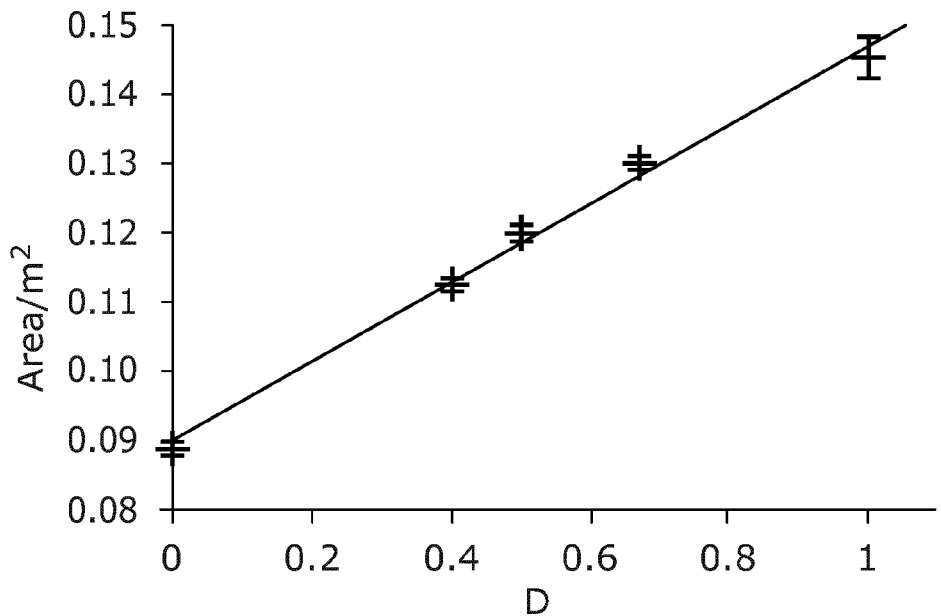
FIG. 4 is a graph showing variation in swap density with area for a knitted fabric.
Figure 5:
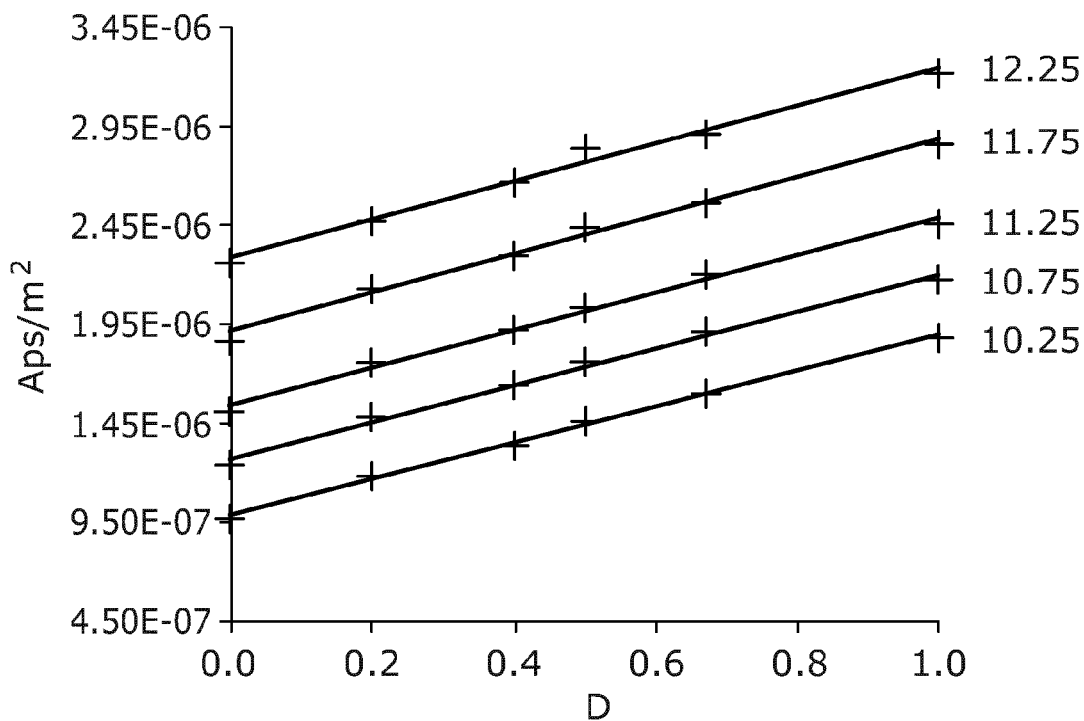
FIG. 5 is a graph showing variation in area per stitch (ApS) with density for various stitch tensions.

FIG. 4 shows a graph demonstrating the proportionality between density D of the patterns used and the measured area for the knitted samples. FIG. 5 shows the relationship between ApS and D for the samples and demonstrates that that the proportionality between ApS and D is independent of Tension (T), the trends only differing by their offset or intercept on the ApS axis.

Figure 6:
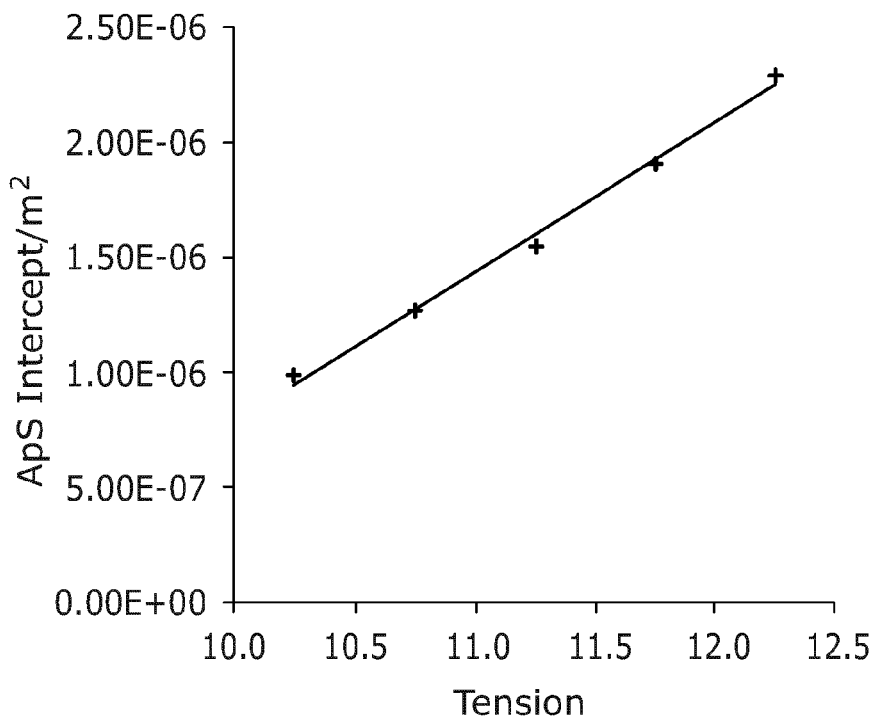
FIG. 6 shows the relationship between the tension T of a knitting yarn with the intercept of the ApS graphs of FIG. 5.

It was then noted that this intercept was proportional to T, as shown in FIG. 6 which shows the variation in APS intercept with T.

Figure 7:
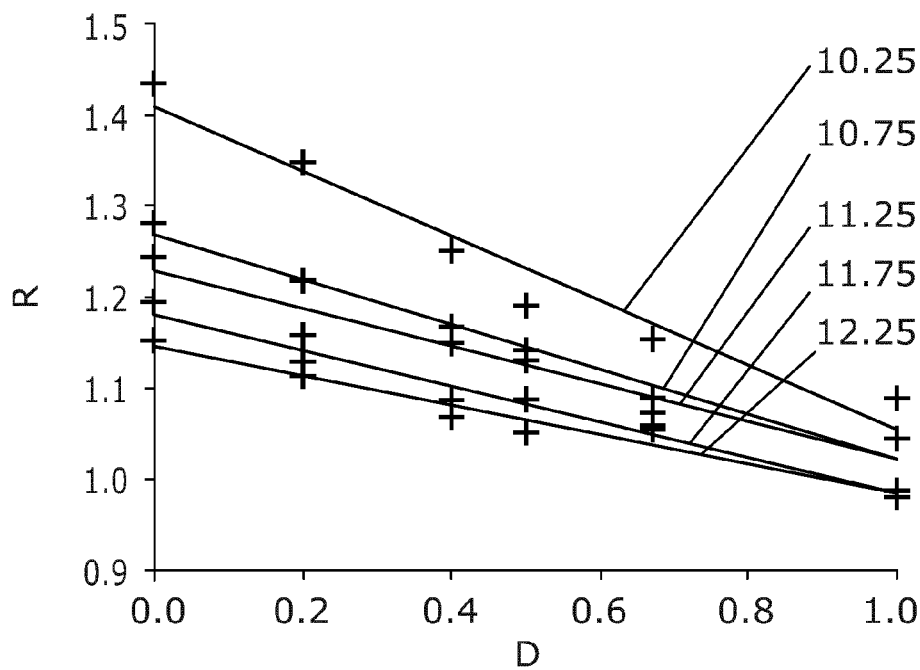
FIG. 7 shows the relationship between the parameter R, equal to the average X dimension over the average Y dimension of all the stitches in a sample with tension for a number of different yarn tensions. It shows the different gradients of the R-D lines for different stitch tensions.

As described above for FIGS. 4 and 5, similar trends are shared by R and D as well as their corresponding intercepts and T, as shown in FIGS. 6 and 7. Error bars were calculated for all graphs using standard error propagation methods but are omitted in all the graphs apart from FIG. 4, due to their small size.

Using these graphs, six parameters were defined to describe the relationship between the variables. The six parameters are:

a: The average gradient of the ApS and D graphs (of FIG. 5)
b: The gradient of the ApS intercept and T line
c: The intercept of the ApS intercept and T line
e: The average gradient of the R and D trend lines f: The gradient of the R intercept and T line
g: The intercept of the R intercept and T line These allow the dimensions Sx and Sy of individual stitches to be determined using the following equations:

$$ApS = aD + bT + c \quad (1)$$

$$R = eD + fT + g \quad (2)$$

$$Sy = \sqrt{\frac{ApS}{R}} \quad (3)$$

$$Sx = RSy = \sqrt{ApS \cdot R} \quad (4)$$

Sy and Sx in equations 3 and 4 respectively are the y and x dimensions of a given stitch. This allows the dimensions of a sample to be calculated by simply multiplying these values by the number of stitches in each direction. To determine the y dimension of a sample the value Sy can be multiplied by the number of rows in the sample.

Figure 8:
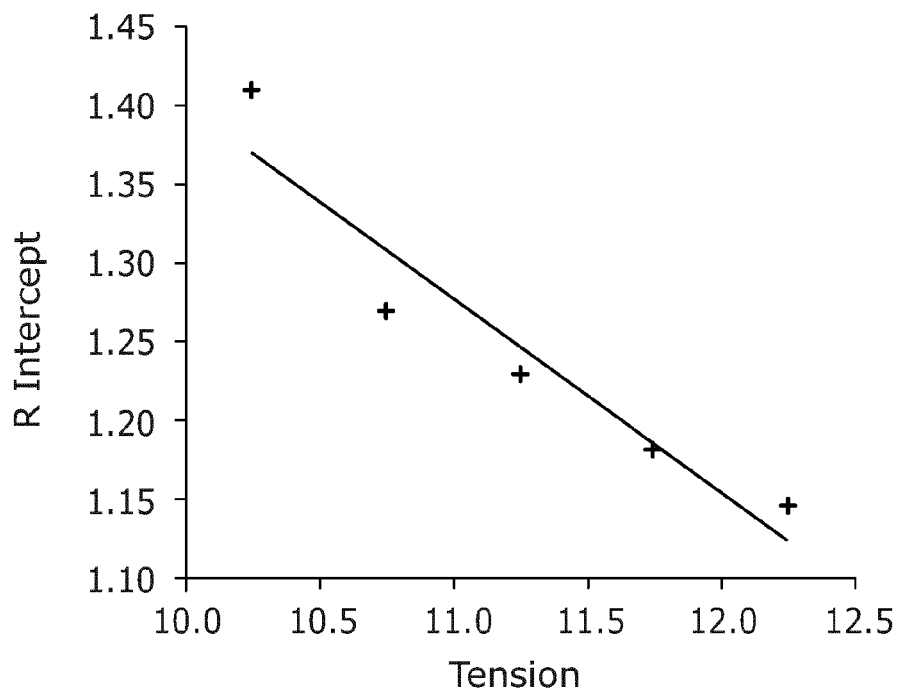
FIG. 8 shows the inverse linear relationship between the tension and R intercept.
Figure 9:
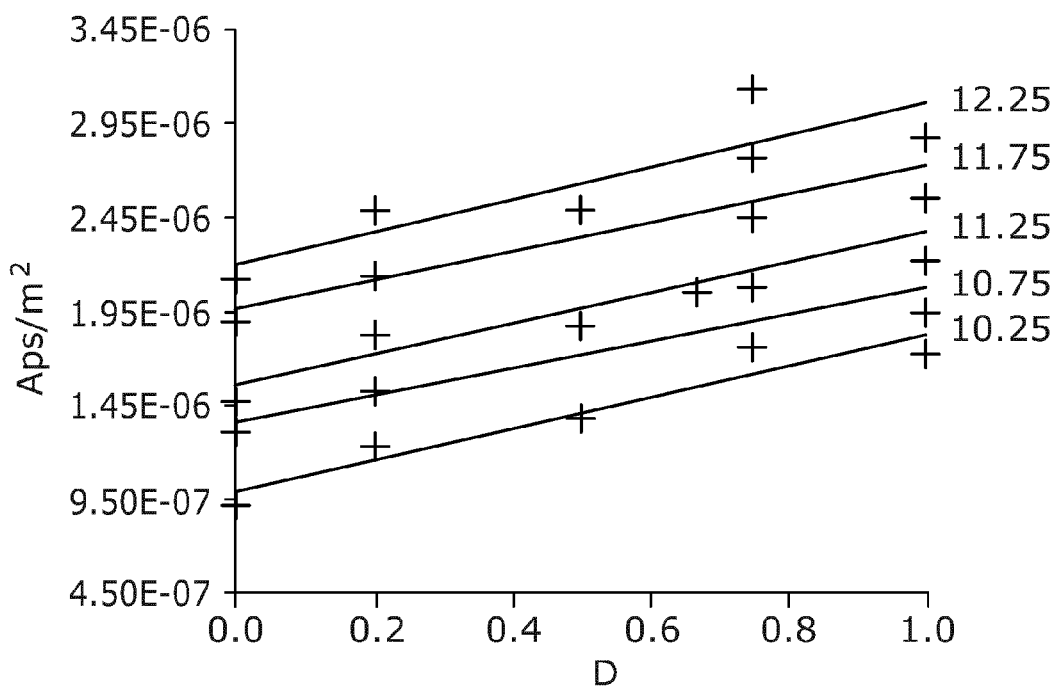
FIG. 9 shows variation in ApS with respect to density for three-colour fabrics at different stitch tensions.
Figure 10:
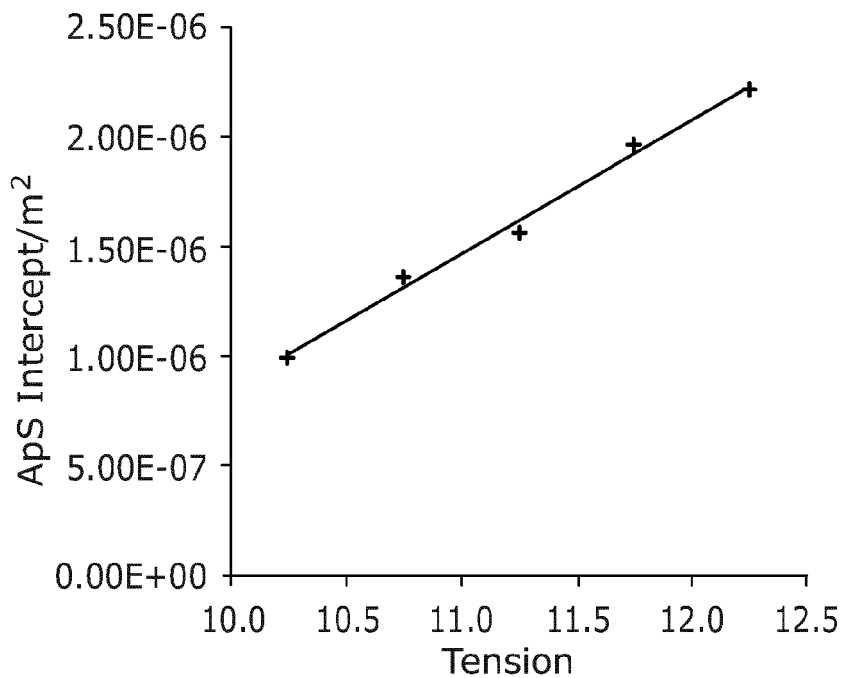
FIG. 10 shows the variation between ApS intercept and tension for the three-colour fabrics used to determine the graphs of FIG. 9.
Figure 11:
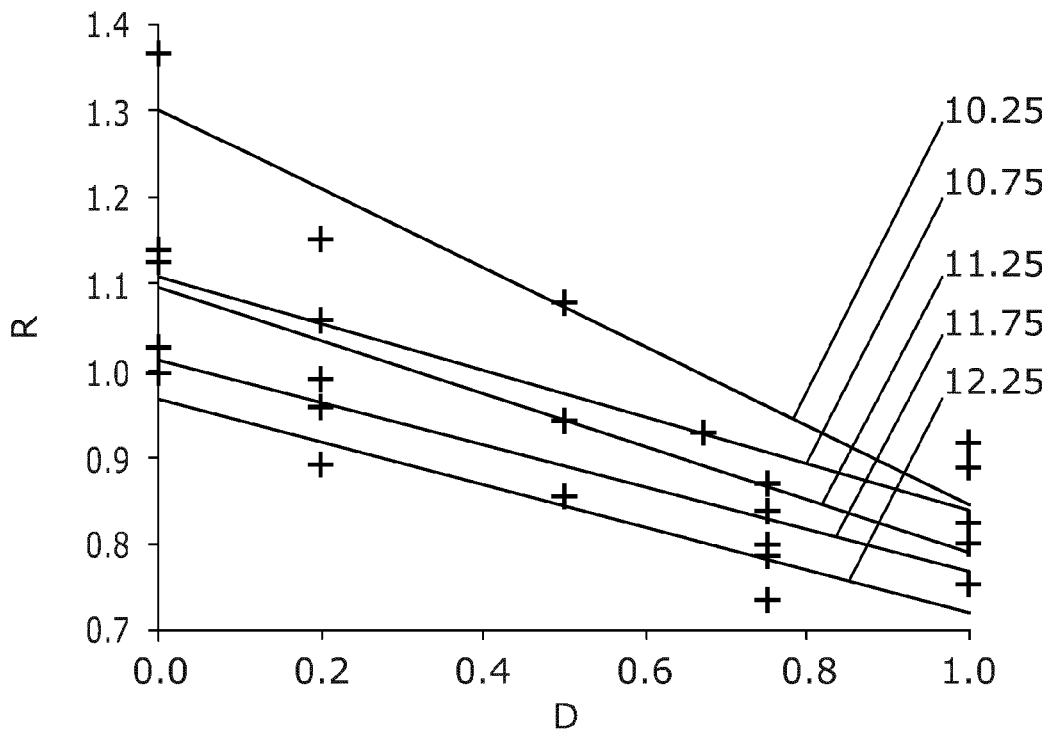
FIG. 11 shows the variation with R with respect to density for three-colour fabrics for various tensions.
Figure 12:
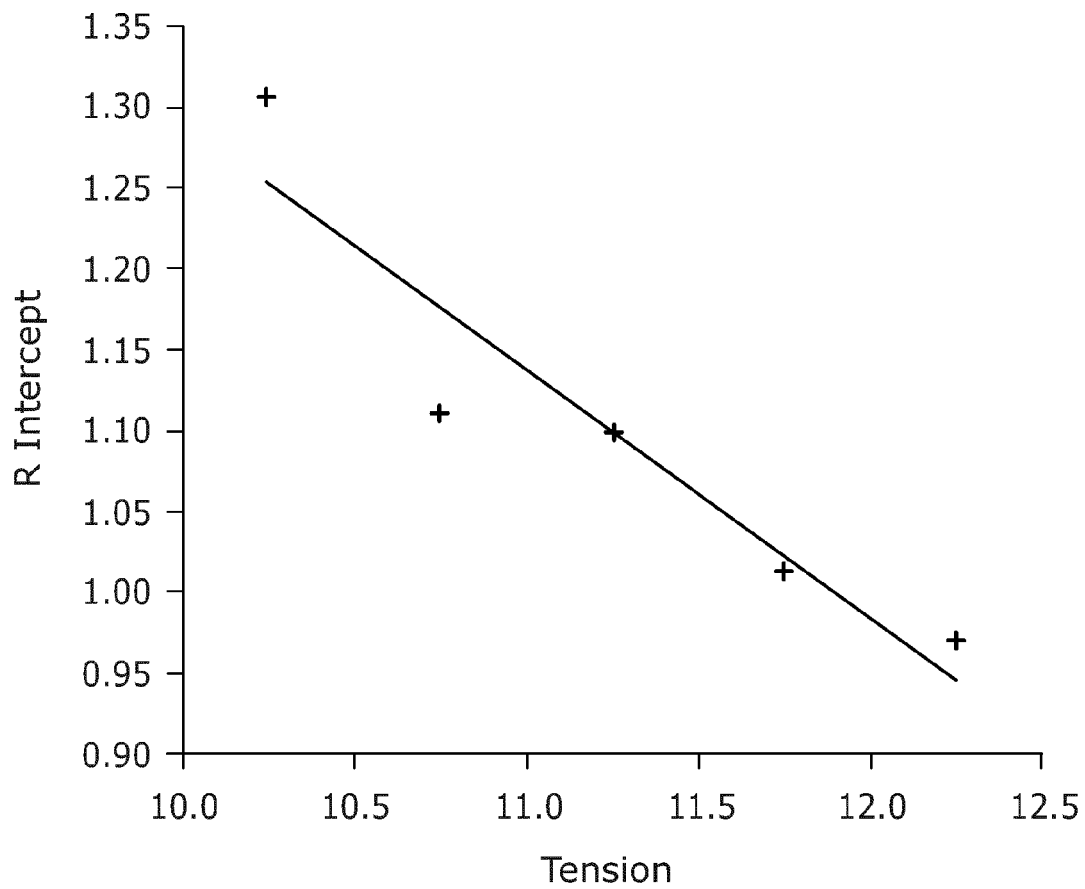
FIG. 12 shows the variation in R intercept of the graphs of FIG. 11.

The values of these parameters along with the form of the equations above represent the Tension control model for 2 colour samples. Using the model it is possible to predict the dimensions of samples of any size and pattern, as long as T was known, and D could be calculated. To this effect, the predicted dimensions of all 30 of the samples were calculated, and compared to their measured dimensions. As shown in FIG. 8, these predictions did not deviate from the measured values by any more than 6%, and in many cases were much more accurate. Also important to note, is that the average error over all 30 samples in both x and y was zero, though this could possibly be expected from the method by which the parameters were calculated.

These errors are likely the product of random errors in measurement and the dimensions of the knitted samples as they show no particular trend when plotted against either D, as shown in the figure, or T. As they depend only on the accuracy of the parameters used in the calculation of their dimensions, improving the quality of these values by adding more and more samples to the pool of results would only reduce the errors.

Thus, the required value of tension T to be applied to a stitch so as to achieve a desired size of stitch can be determined. Over an entire garment or piece of fabric, the size of stitches can be determined so as to produce a garment of a particular size when the density D of the pattern is known. D would be known for any given pattern. The required input or control for a knitting machine or for the stepper motors used to control yarn tensions can therefore be determined.

A further test of the efficacy of the model was the production of a "worst-case" sample, containing 5 distinct regions of varying sizes covering the entire range of D values (0 to 1). The extreme changes in density over short distances in this sample would rarely be encountered in a real garment, with most patterns favouring more natural, gradual shifts. Knitting a sample of this type using a single uniform tension value would result in an extremely distorted and unpredictable shape as the distinct regions would have naturally different dimensions.

The pattern was assigned with 5 tension regions, the value of each being calculated in order to bring that specific region to a required uniform size. The sum of the dimensions of the small regions was taken as the target size of the sample, a range of T values of 10.55 to 12.05 being utilised to give a sample of 300×403 mm in size.

Upon measurement, the completed sample, with adjusted tensions was found to have dimensions of 314×429 mm, representing a difference of 4% and 6% for the x and y dimensions respectively. Visually, the sample also had a fairly uniform shape, a characteristic equally as desirable as controllable dimensions. Satisfied with the accuracy of this early model when applied in a simplified form to this extreme sample, the investigation continued with the application of tension values on a per-stitch level.

So as to further reduce the errors in predictions made by the model, a modification was made such that the gradient of the R and D lines were not approximated to a single value. As can be seen in FIG. 7 it is clearly the case that for different values of T, the gradient of the R-D line differs.

A seventh parameter was added to the model based on the relationship between the gradients of the R and D lines for a given tension, being proportional to the value of tension T for that line.

The model therefore now is expressed as:
a: The average gradient of the ApS and D trend lines
b: The gradient of the ApS intercept and T line
c: The intercept of the ApS intercept and T line
e: The gradient of the R-D gradient and T line
f: The gradient of the R intercept and T line
g: The intercept of the R intercept and T line
h: The intercept of the R-D gradient and T line $$ApS = aD + bT + c \quad (5)$$

$$R = (eT + h)D + fT + g \quad (6)$$

$$Sy = \sqrt{\frac{ApS}{R}} \quad (7)$$

$$Sx = RSy = \sqrt{ApS \cdot R} \quad (8)$$

Thus, as compared to the example of the model described above, in this further example, the parameter e is varied so as now to be defined as the gradient of the R-D gradient and T line and a further parameter, h, is utilised defined as the intercept of the R-D gradient and T line. Furthermore the definition of R is modified to include the variable h as follows: R=(eT+h)D+fT+g.

The primary benefit of this addition was a reduction in the overall errors in the estimation of R. While the mean error remained zero, the standard deviation of the predictions fell from 4.2% to 2.4% for the 2 Colour set and from 7.3% to 4.7% for the 3 Colour set, the larger values for the 3 Colour set being due to its smaller size in comparison to the 2 Colour.

The further improvement of these values was the aim of the following part of the investigation, in which 12 more 2 Colour and 25 more 3 Colour samples were produced, bringing the totals for each set to 42 and 44, respectively. The addition of these data points, combined with the use of the new seven-parameter model, saw the standard deviations in the error in dimensions drop to 1.8% and 2.9% for 2 and 3 colours, respectively. Additionally, the maximum error in predicted dimensions for a small set of user-generated patterns knitted using a uniform tension fell to 1.4% and 1.5%. This set of predictions represented an important benchmark for the accuracy of the model as the patterns are more in line with those to which the model would be applied in practice. The reduction of the maximum error to these levels allows some leeway for other sources of error such as those caused by the machine itself or its control software.

Thus by using this exemplary model it is possible to determine stitch length (or tension) required so as to achieve a desired overall shape and dimension to a knitted article so long as the density D of (or number of swaps within) the pattern is known. The specific examples of the model described above provide an efficient and simple way to determine for a given density D, what values of stitch length should be used for stitches that are within the region of fabric with the known value of density. It will be appreciated that although the examples given above work well, the general teaching here is that by the use of an empirical model, values of stitch length can be determined that are usable in a knitting machine in such a way that a piece of fabric or garment output from the machine has predictable and desired qualities. It follows that with the calculations done in advance the method can be used for producing a single bespoke article which will have a defined and desired size without the need for trial and error to determine control parameters for the knitting machine.

Washing

Figure 13:
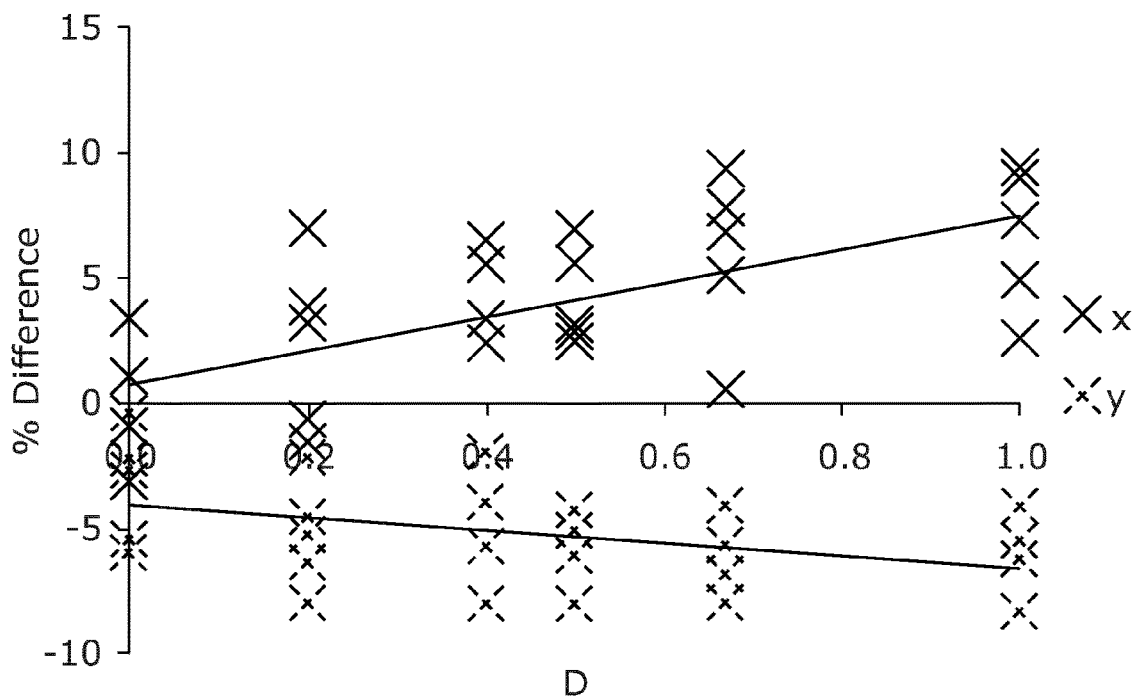
FIG. 13 shows a representation of changes in dimension from washing a two-colour fabric prepared using different stitch densities.
Figure 14:
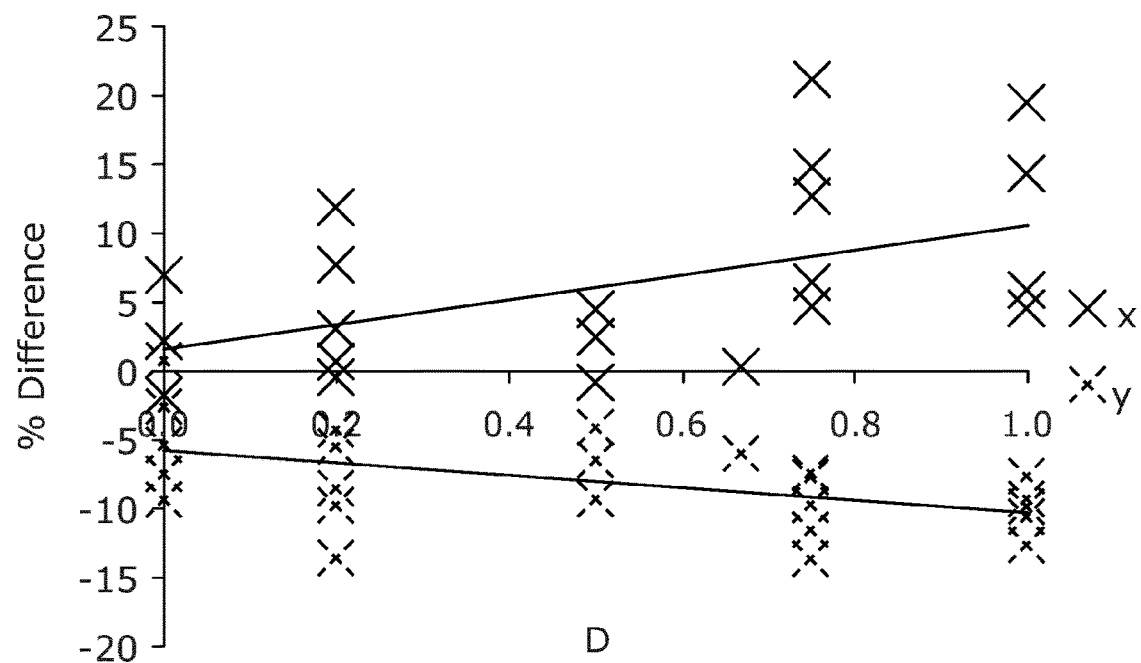
FIG. 14 is a similar graph to that of FIG. 13 except it shows changes in dimension for three-colour fabric.

FIGS. 13 and 14 show how the dimensions of samples change with washing. FIG. 13 shows the example of washing 2 colour samples and FIG. 14 the washing of 3 colour samples.

Given that after washing the dimensions seemed to undergo some change, which would of course always be expected, it means that the values for the parameters input to the model would correspondingly change.

Yarns

The model can be used irrespective of the yarn that is to be used in the subsequent knitting. Examples include merino wool, high-quality cashmere and other yarns too.

Model Testing

Applying independent tension values to individual stitches is not possible using conventional or traditional machine control software. It has been recognised however that knitting machines can be used in this way if appropriate controls and inputs are used. This has now been achieved by utilisation of a modified file used to produce a given panel, wherein the file has correct instructions within it. In a preferred example, the machine files are for use with the knitting machines, such as knitting machines manufactured by Stoll GmbH or Shima Seiki. As described above, in practice what is most easily controlled in a knitting machine is the depth that each of the needles is controlled to move to. This can be used to impart desired tensions to individual stitches since for a greater depth of needle or greater stitch length, the tension will typically also increase.

The machine files are produced using a series of templates into which parameters such as pattern, colour, structure, shape and tension information is inserted, allowing a desired panel to be knitted to specification with relatively little human interaction.

Input File

The process by which a file may be produced so as to generate a desired garment from a knitting machine will be described. When a garment is produced, a pattern is typically specified via a simple bitmap file which is passed to control software for a knitting machine. Each pixel of the bitmap directly corresponds to a stitch in the resulting sample, the yarn used to knit each stitch is specified by the RGB colour of the pixel. In addition, the machine adds several rows of stitches above and below the main pattern, referred to as "technical stages", which are required for proper machine function.

After a bitmap is created, the machine software assigns tensions to each stitch and produces a file which is passed to the machine itself. The assignment of tensions is conducted manually via a system of colour coding. While simple for large regions, assigning tensions to a larger number of smaller regions becomes extremely time consuming and impractical. Furthermore, the capability for such a machine to knit individual stitches with independent tension values is not implemented in conventional software. Modification of the machine files is complex, but would in theory allow tensions to be applied on a per-stitch basis granting the most precise control of garment size.

As mentioned above in the present method, instead of utilising conventional control software for such a knitting machine, a file is produced which includes the correct tension instructions. This has been demonstrated to work with use of a particular complex test pattern as shown in and as will now be described with reference to FIGS. 15a to 15c and 16a to 16c. In this example, the pattern referred to as a "wave" pattern features both rapid changes of density in the pattern region as well as a non-uniform total density across the entire sample.

In FIG. 15a, the example desired pattern is first shown. From this, an initial density map is produced as seen in FIG. 15b. Thus, based on the pattern the density of swaps is determined so as to produce over the two dimensional area of the pattern a high definition density map. In one example the density map is determined by using a horizontal differencing kernel and applying a multi-row windowed average. It will be appreciated that a single stitch on its own cannot have a density as the density refers to the relative number of swaps between stitches within a defined region.

Once the initial density map is generated (shown in FIG. 15b), a blur is applied to it, to generate a processed density map which helps in enabling stitch length values to be determined in subsequent processing steps. In the example of FIG. 15c, a vertical Gaussian blur is applied to the initial density map of FIG. 15b.

Looking at FIGS. 16a to 16c, 16a again shows the example pattern. From the processing described with reference to FIGS. 15b and 15c, a target tension map is calculated using the model described above. FIG. 16a again shows the actual desired pattern to be knitted into a fabric. The processed density map of FIG. 15c is taken as an input and together with the parametrised model described above an initial tension or stitch length map is produced shown in FIG. 16b. The initial tension or stitch length map is then quantised to a usable number of unique tensions by specifying a minimum horizontal region size. The quantised tension map is shown in FIG. 16c. One example of a method by which the quantisation may be achieved is with the use of a dithering algorithm such as the well known Floyd-Steinberg dithering algorithm.

In this example, in the initial tension or stitch length map the total set of values for available tensions for each stitch is large and includes, say 25 values of tension or stitch length. Although in theory this number could be used, in practice using such a large number of tension or stitch length values is hard to implement on current knitting machines and so the number is reduced by a further quantisation step. Typically, the number of values in the reduced or quantised set is somewhere between 10 and 16. In the specific example of FIG. 16c, the number of values in the set is reduced to 15.

The minimum horizontal region size can be anything from one to ten stitches in width. In the example shown, a minimum horizontal region size of six stitches was utilised.

Furthermore, optional yarn-dependent safe limits are used such that if, for example, it is determined that a particular value of tension is needed, but this is not consistent with say limits of a specific yarn, the value of tension is modified accordingly. Thus, FIG. 16c shows a tension map which can thus be used as the input within the control file for a knitting machine.

Typically, an initial full tension map might have, say, 19 independent tension values within it, whereas in a tension map that has been quantised for use as an input to a knitting machine, the value is reduced to, say, ten.

FIGS. 17a and 17b show a further example of an initially determined tension map (FIG. 17a) and then a quantised version (FIG. 17b) in which the number of tensions has been reduced from the original value of 19 to a quantised value of 10.

The filters and Gaussian blurs that are applied during the production of the quantised tension map can be varied and chosen so as to achieve the desired level of quantisation in the output file. Typically, the chosen filters might be any one or more selected from the group including:
  Gaussian blur of radius 5 pixels
  Median filter in a 9 pixel window
  Modal filter in a 9 pixel window
  Max value filter in a 7 pixel window
  Minimum value filter in a 7 pixel window Also tested were various values for the i parameter related to the window size used in the creation of the density map. Aside from the default of 6, values of 3, 9, 12 and 15 were tested.

However, despite the noticeable visible differences in the maps created using the various filters, the changes in dimensions and appearance were negligible. As no one technique was a clear improvement over the others, it was decided to continue using the original blur filter and an i value of 6.

More extensive or targeted tests may reveal a preferred filtering method. Specifically, larger i values may improve the appearance and consistency of samples containing sharp changes or distinct bands of different densities. Minimum or Maximum filters may also have application in tightening or loosening a given sample whilst still retaining regions of relative tension and the resulting consistency in panel dimensions.

Figure 19:
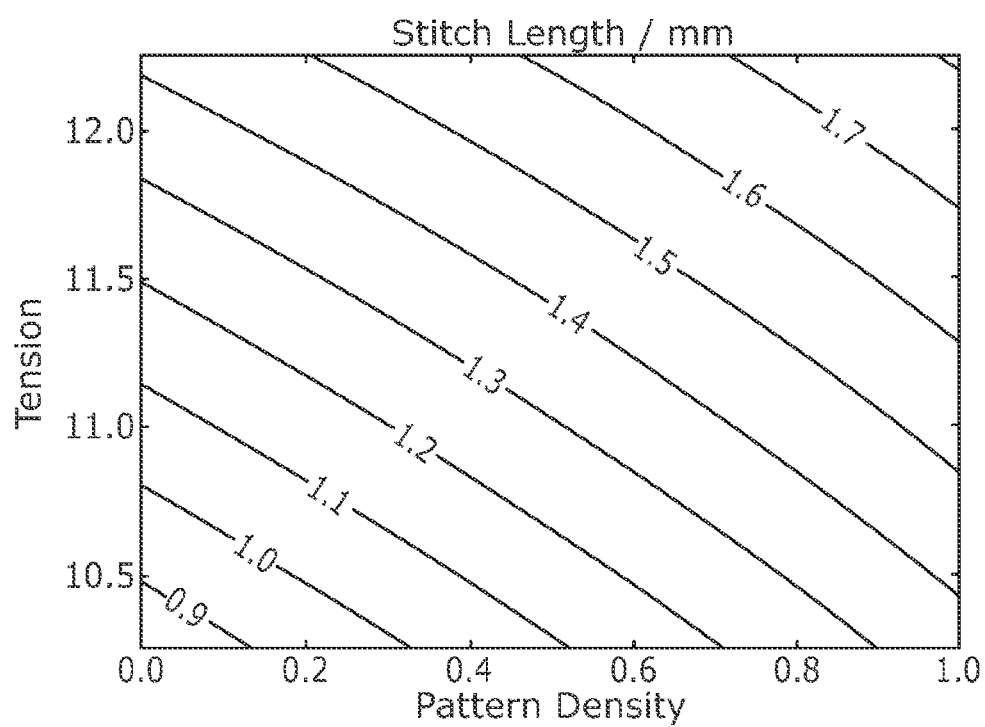
FIG. 19 shows a number of sections through the three-dimensional plot of FIG. 17 for varying individual stitch lengths.

Throughout it has been explained that the relationship between stitch tension and stitch length is effectively an inverse linear relationship. This is shown schematically in FIG. 18 which shows a three dimensional plot of the relationship between density D, tension and stitch length as calculated using the exemplary models described above. FIG. 19 shows a selection of lines taken from the 3D plot of FIG. 18, showing variation of tension and density for constant values of stitch length varying from 0.9 mm to 1.7 mm.

Figure 20:
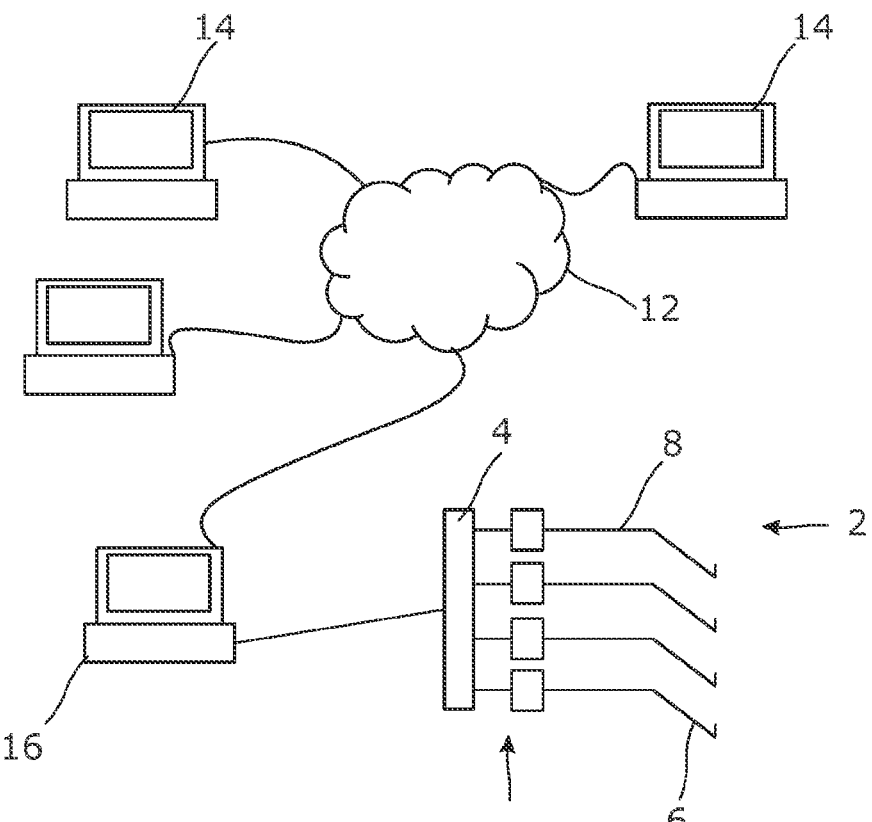
FIG. 20 is a schematic representation of a knitting machine and a control system for implementation of the present method.

FIG. 20 is a schematic representation of a knitting machine 2. The machine comprises a main body incorporating a control unit 4. A plurality of needles 6 are provided each arranged to knit with a corresponding yarn 8. A plurality of stepper motors 10 are provided each arranged to receive a control or drive signal from the control unit 4. The control unit is arranged to control the stepper motors so as to vary the tensions applied to the yarns during knitting so as to execute the method described above, by which tensions are varied in dependence on the pattern to be knitted.

In the example shown the knitting machine 2 is coupled via a control computer 16 to network 12, which could be a public or private network to enable it to receive instructions from users via user terminals 14. Thus the machine is able to receive data remotely from users' terminals 14 or locally from control computer 16. The tension information that could be calculated in accordance with the method or models described above is preferably integrated directly into a machine file for provision to the knitting machine.

The various computers 16 and 14 could be arranged to operate in accordance with our co-pending international applications PCT/EP2015/061375, PCT/EP2015/076485 and PCT/EP2016/052571, the entire contents of all of which are hereby incorporated by reference.

The present method could be applied in the production of various types of jacquard, i.e. a structure that can produce an image by using multiple colours of yarn. Examples of Jacquard structures to which the method could be applied include Net, Twill, Float, Twill-tuck, Ladderback, Stripe and Birdseye. These structures are produced using different combinations of standard knitting operations and stitches. A non-exhaustive list of some of the most commonly used stitches which might be used within the above structures is as follows: Front knit, Back knit, Tuck, Miss/Drop, Pointelle and Split stitch.

Exemplary embodiments of the present invention have been described with particular reference to the examples illustrated. However, it will be appreciated that variations and modifications may be made to the examples described and that they are within the scope of the present invention as defined by the claims that follow.

The invention claimed is:

1. A method of knitting a fabric using a knitting machine, wherein the knitting machine is arranged to knit with a plurality of yarns using a plurality of knitting needles, each knitting needle being arranged during knitting of a stitch to connect with and knit with one of the plurality of yarns; the method comprising:
  controllably varying the stitch length for each stitch in dependence on a pattern to be knitted, in which a density of a knitted fabric is defined as a ratio of swaps to stitches present in the knitted fabric and in which the stitch length is varied in dependence on the density of the pattern of the knitted fabric;
  in which density for the knitted fabric may be determined by taking, as an input, an initial graphical representation of the pattern to be knitted and then executing the following steps:
  generating an initial density map based on the pattern to be knitted; and
  applying a filter to the initial density map to generate a processed density map.

2. The method according to claim 1, in which the knitting machine includes a plurality of mechanisms each for controlling a corresponding needle and in which the method comprises individually controlling the plurality of mechanisms to achieve a desired stitch length.

3. The method according to claim 2, in which each of the individual mechanisms is a stepper motor and the method comprises controlling operation of the various stepper motors to achieve the desired stitch length.

4. The method according to claim 1, in which the stitch length is determined in accordance with parameters defining a model based on at least the density of the pattern to be knitted.

5. The method according to claim 4, in which the model is a multivariate model to determine stitch lengths.

6. The method according to claim 5, in which obtaining outputs from the multivariate model includes generating graphs of the parameters selected from the group including:
the average gradient of the ApS and density (D), graphs;
the gradient of the ApS intercept and T line;
the intercept of the ApS intercept and T line;
the average gradient of the R and density (D) trend lines;
the gradient of the R intercept and T line; and
the intercept of the R intercept and T line.

7. The method according to claim 4, in which the model is arranged to determine stitch lengths Sx in the x and Sy in the y defined dimensions for the fabric to be knitted, and wherein the model includes the following parameters:

$$ApS = aD + bT + c$$
$$R = eD + fT + g$$
$$Sy = \sqrt{\frac{ApS}{R}}$$
$$Sx = RSy = \sqrt{ApS.R}$$

in which
a: the average gradient of the ApS and density (D) graphs;
b: the gradient of the ApS intercept and T line;
c: the intercept of the ApS intercept and T line;
e: the average gradient of the R and density (D) trend lines;
f: the gradient of the R intercept and T line; and
g: the intercept of the R intercept and T line.

8. The method according to claim 7, in which a further parameter h is utilised wherein h is defined as the gradient of the R-D gradient and T line and wherein $$R=(eT+h)D+fT+g.$$

9. The method according to claim 4, comprising, applying the following steps to the processed density map:
generating an initial tension map using the parametrised model to determine stitch lengths required to achieve a desired output for the fabric wherein the method comprises generating from the initial tension map, a quantised tension map in which the number of individual tensions used is reduced, in which the reduced number of tensions is between 9 and 16.

10. The method according to claim 1, in which the stitch length is varied so as to control on a per row basis a length of yarn used within the knitted article.

11. A knitting machine for knitting a fabric, the knitting machine comprising:
a plurality of knitting needles, each knitting needle being arranged during knitting of a stitch to connect with and knit with one of a plurality of yarns;
a controller to controllably vary stitch length for each stitch in dependence on a pattern to be knitted;
wherein a density of the knitted fabric is defined as a ratio of swaps to stitches present and in which the stitch length is varied in dependence on the density of the pattern of the fabric to be knitted;
in which density for the knitted fabric may be determined by taking, as an input, an initial graphical representation of the pattern to be knitted and then executing the following steps:
generating an initial density map based on the pattern to be knitted; and
applying a filter to the intial density map to generate a processed density map.

12. The knitting machine according to claim 11, comprising a plurality of variable tension applicators, each arranged to vary the tension of one or more of the plurality of yarns.

13. The knitting machine according to claim 11, wherein the controller comprises a processor arranged to execute the method of claim 1 so as to determine the stitch lengths and/or tensions to be applied to the plurality of yarns being used to knit the fabric.

14. A controller for a knitting machine, said knitting machine being arranged to knit a fabric using a plurality of knitting needles, each knitting needle being arranged during knitting of a stitch to connect with and knit with one of a plurality of yarns, the controller being arranged to:
receive details of a pattern to be knitted in order to determine stitch lengths and/or tensions to be applied to the plurality of yarns during knitting in dependence on the received details of the pattern to be knitted, wherein a density of the knitted fabric is defined as a ratio of swaps to stitches present and in which the stitch lengths are varied in dependence on the density of the pattern to be knitted
in which density for the knitted fabric may be determined from a processed density map itself determined by taking, as an input, an initial graphical representation of the pattern to be knitted and then executing the following steps:
generating an initial density map based on the pattern to be knitted; and
applying a filter to the initial density map to generate a processed density map.

15. The controller according to claim 14, further comprising a processor arranged to execute the method of claim 1 so as to determine the stitch lengths and/or tensions to be applied to the plurality of yarns being used to knit the fabric.

16. A method of determining stitch lengths for stitches on a knitting machine, to be applied across a fabric during knitting thereof, the method comprising:
in dependence on a density of swaps within the fabric, varying the stitch lengths accordingly, in which a density of a knitted fabric is defined as a ratio of swaps to stitches present in a pattern of the knitted fabric, and in which the stitch length is varied in dependence on the density of the pattern of the knitted fabric;
wherein density for the knitted fabric is determined by taking, as an input, an initial graphical representation of the pattern to be knitted and then;
generating an initial density map based on the pattern to be knitted; and
applying a filter to the initial density map to generate a processed density map.

17. The method according to claim 16, in which the stitch length is determined in accordance with a model defining parameters based on at least the density of the pattern to be knitted.

18. The method according to claim 17, in which the model is arranged to determine stitch lengths Sx in the x and Sy in the y defined dimensions for a fabric to be knitted, and wherein the model includes the following parameters:

$$ApS = aD + bT + c$$
$$R = eD + fT + g$$
$$Sy = \sqrt{\frac{ApS}{R}}$$
$$Sx = RSy = \sqrt{ApS.R}$$

in which
- a: the average gradient of the ApS and density (D) graphs;
- b: the gradient of the ApS intercept and T line;
- c: the intercept of the ApS intercept and T line;
- e: the average gradient of the R and density (D) trend lines;
- f: the gradient of the R intercept and T line; and
- g: the intercept of the R intercept and T line.

19. The method according to claim 18, in which a further parameter h is utilised wherein h is defined as the gradient of the R-D gradient and T line and wherein $$R = (eT+h)D + fT + g.$$

* * * * *